US012545965B2

(12) United States Patent
Tets et al.

(10) Patent No.: US 12,545,965 B2
(45) Date of Patent: Feb. 10, 2026

(54) METHOD FOR ASSESSING AND INHIBITING AGING AND MEANS OF DETERMINING BIOLOGICAL AGE

(71) Applicants: Viktor Veniaminovich Tets, New York, NY (US); Georgy Viktorovich Tets, New York, NY (US)

(72) Inventors: Viktor Veniaminovich Tets, New York, NY (US); Georgy Viktorovich Tets, New York, NY (US)

(73) Assignees: Viktor Veniaminovich Tets, New York, NY (US); Georgy Viktorovich Tets, New York, NY (US)

( * ) Notice: Subject to any disclaimer, the term of this patent is extended or adjusted under 35 U.S.C. 154(b) by 252 days.

(21) Appl. No.: 17/257,389

(22) PCT Filed: Jul. 3, 2019

(86) PCT No.: PCT/US2019/040524
§ 371 (c)(1),
(2) Date: Dec. 31, 2020

(87) PCT Pub. No.: WO2020/010214
PCT Pub. Date: Jan. 9, 2020

(65) Prior Publication Data
US 2021/0230674 A1      Jul. 29, 2021

Related U.S. Application Data

(60) Provisional application No. 62/693,773, filed on Jul. 3, 2018.

(51) Int. Cl.
*C12Q 1/689* (2018.01)
(52) U.S. Cl.
CPC ........ *C12Q 1/689* (2013.01); *C12Q 2600/118* (2013.01)
(58) Field of Classification Search
CPC ......... C02F 1/78; C02F 1/32; C12Q 2600/118
See application file for complete search history.

(56) References Cited

U.S. PATENT DOCUMENTS

| | | | | |
|---|---|---|---|---|
| 4,255,383 A * | 3/1981 | Schenck | ................. | A23B 2/53 |
| | | | | 210/764 |
| 5,955,287 A | 9/1999 | Fernandez-Pol | | |
| 6,201,104 B1 | 3/2001 | MacDonald et al. | | |
| 6,528,269 B1 | 3/2003 | Sy et al. | | |
| 6,814,876 B1 * | 11/2004 | Neal | ................. | C02F 9/00 |
| | | | | 210/260 |
| 9,063,141 B2 | 6/2015 | Grallert et al. | | |
| 2002/0012927 A1 | 1/2002 | Burmer et al. | | |
| 2005/0124794 A1 | 6/2005 | McCrae et al. | | |
| 2006/0233780 A1 | 10/2006 | Genkin et al. | | |
| 2006/0263767 A1 | 11/2006 | Castrillon et al. | | |
| 2007/0221559 A1 * | 9/2007 | Wang | ................. | C02F 1/325 |
| | | | | 210/222 |
| 2008/0194928 A1 * | 8/2008 | Bandic | ................. | A61B 5/443 |
| | | | | 600/306 |
| 2013/0183284 A1 | 7/2013 | Genkin et al. | | |
| 2013/0203849 A1 | 8/2013 | Ben Yehuda | | |
| 2014/0234260 A1 | 8/2014 | Borody | | |
| 2014/0271701 A1 | 9/2014 | Sechi et al. | | |
| 2017/0020937 A1 | 1/2017 | Mattey et al. | | |

FOREIGN PATENT DOCUMENTS

| | | | | |
|---|---|---|---|---|
| CA | 2628552 A1 | 5/2007 | | |
| CN | 107191015 A | * 9/2017 | ............... | C02F 9/00 |
| DE | 10157355 A1 | * 6/2002 | ............. | C02F 1/325 |
| HU | 0100159 A2 | 5/2001 | | |
| WO | 2016190780 A1 | 12/2016 | | |
| WO | 2017042831 A2 | 3/2017 | | |
| WO | 2017118924 A1 | 7/2017 | | |
| WO | 2019028456 A1 | 2/2019 | | |

OTHER PUBLICATIONS

Jylhava et al. EBioMedicine (2017) vol. 21, pp. 29-36. (Year: 2017).*
Palma et al., Clinical Cosmetic and Investigational Dermatology, 2015, 413-421.*
Office Action issued Jul. 13, 2022 in connection with U.S. Appl. No. 16/616,231.
M. Dupon, et al., "Plasma levels of piperacillin and vancomycin used as prophylaxis in liver transplant patients", Eur J Clin Pharmacol (1993) 45:529-534.
Office Action issued Mar. 30, 2023 in connection with U.S. Appl. No. 17/256,428.
Google patent translation of HU0100159A2 (Year: 2001).
Office Action mailed Apr. 24, 2023 in connection with U.S. Appl. No. 16/616,231.
Anderson et al., "Enumeration of bacteriophage particles" Bacteriophage 1(2):86-93 (2011).
Biagi, E. et al., "Through Ageing and Beyond: Gut Microbiota and Inflammatory Status in Seniors and Centenarians" (2010) PLoS One vol. 5, Issue 5, pp. 1-14.
Claesson, M.J. et al., "Gut Microbiota Composition Correlates with Diet and Health in the Elderly" Nature (2012) vol. 488, No. 7410, pp. 178-184.
Communication (International Search Report) mailed in International Application No. PCT/US19/40524 mailed Nov. 18, 2019, 9 pages total.
Communication (Written Opinion) mailed in International Application No. PCT/US19/40524 mailed Nov. 18, 2019, 10 pages total.

(Continued)

*Primary Examiner* — Kyle A Purdy
(74) *Attorney, Agent, or Firm* — Troutman Pepper Locke LLP

(57) ABSTRACT

Provided herein are methods for assessing ageing process, lifespan, life expectancy, biological age and the rate of aging by determining pangenome gene alterations. Specifically, the methods comprising determination of the alteration of the gene composition in mammals and/or non-living genetic elements (NLGE) associated with mammals and at least one of the following: microbiota and/or NLGE associated with microbiota. The methods can be used for increasing lifespan and/or for inhibiting aging in mammals.

2 Claims, 2 Drawing Sheets

Specification includes a Sequence Listing.

(56) References Cited

OTHER PUBLICATIONS

Juge, R. et al., "Shift in Skin Microbiota of Western European Women Across Aging" Journal of Applied Microbiology (2018) vol. 125, No. 3, pp. 907-916.
Jylhava, J. et al., "Biological Age Predictors" EBioMedicine (2017) vol. 21, pp. 29-36.
O'Toole, P.W. et al., "Gut Microbiota and Aging" Science (2015) vol. 350, No. 6265, pp. 1214-1215.
Petrascheck, M. et al., "Computational Analysis of Lifespan Experiment Reproducibility" Frontiers in Genetics (2017) vol. 8, No. 92, pp. 1-11.
Pitchaimani, M. et al., "Maximum Life Span Predictions Using the Gompertz Tumour Growth Model" IOSR Journal of Mathematics (2014) vol. 10, Issue 6, pp. 55-62.
Tetz, G. et al., "Tet's Theory and Law of Longevity" Theory in Biosciences (2018) vol. 137, No. 2, pp. 145-154.
Supplementary European Search Report issued Feb. 9, 2022 in connection with EP Application No. 19826448.
Gianchecchi E. et al., "On the pathogenesis of insulin-dependent diabetes mellitus: the role of microbiota", Immunologic Research, Humana Press, Inc. US, vol. 65, No. 1, Jul. 16, 2016, pp. 242-256.
Vaarala O. et al., "The Perfect Storm" for Type 1 Diabetes: The Complex Interplay Between Intestinal Microbiota, Gut Permeability, and Mucosal Immunity, Diabetes, vol. 57, No. 10, Sep. 26, 2008, pp. 2555-2562.
Kosiewicz M. et al., "Relationship between gut microbiota and development of T cell associated disease", Febs Letters, Elsevier Amsterdam, NL, vol. 588, No. 22, Mar. 26, 2014, pp. 4195-4206.
European Communication (Extended European Search Report) issued by the European Patent Office in European Application No. 19830501.3 dated Mar. 10, 2022, 11 pages total.
Jonas Zierer et al., "Integration of "omics" data in aging research: from biomarkers to systems biology", Aging Cell, vol. 14, No. 6, Aug. 30, 2015, pp. 933-944, XP055766774, GB issn: 1474-9718, DOI: 10.1111/acel.12386.
Garagnani P. et al., "The Three Genetics (Nuclear DNA, Mitochondrial DNA, and Gut Microbiome) of Longevity in Humans Considered as Metaorganisms", Biomed Research Int, vol. 2014, (Jan. 1, 2014), pp. 1-14, XP055896304, ISSN: 2314-6133, DOI: 10.1155/2014/560340.
Dato Serena et al, "The genetics of human longevity: an intricacy of genes, environment, culture and microbiome", Mechanisms of Ageing and Development, (Jan. 1, 2017), vol. 165, doi: 10.1016/J.MAD.2017.03.011, ISSN 0047-6374, pp. 147-155, XP085162845.
Xian Xia et al., "Molecular and phenotypic biomarkers of aging", F1000RESEARCH, (Jan. 1, 2017), vol. 6, pp. 1-10 doi:10.12688/f1000research.10692.1, 860, XP055388474.
Santoro Aurelia et al, "Gut microbiota changes in the extreme decades of human life: a focus on centenarians", CMLS Cellular and Molecular Life Sciences, Birkhauser Verlag, Heidelberg, DE, vol. 75, No. 1, doi:10.1007/S00018-017-2674-Y, ISSN 1420-682X, (Oct. 14, 2017), pp. 129-148, (Oct. 14, 2017), XP036389430.
Elena Biagi et al, "Gut Microbiota and Extreme Longevity", Current Biology, GB, (Jun. 1, 2016), vol. 26, No. 11, doi:10.1016/j.cub.2016.04.016, ISSN 0960-9822, pp. 1480-1485, XP055683144.
Castilla et al., "In Vitro Generation of Infectious Scrapie Prions," Cell, Apr. 22, 2005, vol. 121, pp. 195-206.
Cordeiro et al., "DNA Converts Cellular Prion Protein in the B-Sheet Conformation and Inhibits Prion Peptide Aggregation," The Journal of Biological Chemistry, Dec. 28, 2001, vol. 276, No. 52, pp. 49400-49409.
Prusiner, S. "Biology and Genetics of Prions Causing Neurodegeneration," Annual Review of Genetics, Nov. 23, 2013, vol. 47, pp. 601-623.
Kipkorir et al., "Highly Infectious CJD Particles Lack Prion Protein but Contain Many Viral-Linked Peptides by LC-MS/MS," Journal of Cellular Biochemistry, Jun. 16, 2014, vol. 115, No. 11, pp. 2012-2221.

Tetz et al., "Prion-like Domains in Eukaryotic Viruses," Scientific Reports, Jun. 12, 2018, vol. 8, pp. 1-10.
Tetz et al., "Bacterial DNA Induces the Formation of Heat-Resistant Disease-Associated 'Tezt-Proteins' in Human Plasma," bioRxiv, Apr. 9, 2019, pp. 1-24.
Tetz et al., "Effect of Deoxyribonuclease I Treatment for Dementia in End-Stage Alzheimer's Disease: a Case Report," Journal of Medical Case Reports, May 28, 2016, vol. 10, No. 1, pp. 1-3.
Written Opinion dated Jul. 23, 2019, issued in connection with international Application No. PCT/US2019/026272, 18 pages total.
International Search Report dated Jul. 23, 2019, issued in connection with international Application No. PCT/US2019/026272, 6 pages total.
International Report on Patentability dated Nov. 3, 2020, issued in connection with international Application No. PCT/US2019/026272, 19 pages total.
Supplementary Partial European Search Report issued Feb. 2, 2022 in connection with EP Application No. 19796997.
March Z. M. et al., "Prion-like domains as epigenetic regulators, scaffolds for subcellular organization, and drivers of neurodegenerative disease", Brain Research, Elsevier, Amsterdam, NL, vol. 1647, Mar. 19, 2016, pp. 9-18.
Stefanov K. P. et al., "Distinct modulatory role of RNA in the aggregation of the tumor suppressor protein p53 core domain", Journal of Biological Chemistry, vol. 292, No. 22, Apr. 18, 2017, pp. 9345-9357.
Janeway C. A. et al., "The complement system and innate immunity—Immunology—NCBI Bookshelf" In: "Immunobiology: The Immune System in Health and Disease", Jan. 1, 2001, Garland Science, New York, pp. 1-14.
Sim et al., "Nucleophilic compounds acting on C3 and C4", Activators and Inhibitors of Complement, Springer Netherlands, Dordrecht, pp. 107-125, Oct. 31, 1992.
Fernandez-Pol Alberto J. et al., "Genomics, Proteomics and Cancer: Specific Ribosomal, Mitochondrial, and Tumor Reactive Proteins Can Be Used as Biomarkers for Early Detection of Breast Cancer in Serum", Cancer Genomics & Proteomics, vol. 2, No. 1, Jan. 1, 2005, pp. 1-24.
Bille, E. et al., "Association of a Bactriophage with Meningococcal Disease in Young Adults," PLoS One (2008) vol. 3, Issue 12, 6 pages total.
De Paepe, M. et al., "Bacteriophages: An Underestimated Role in Human and Animal Health?" Frontiers in Cellular and Infection Microbiology (2014) vol. 4, Article 39, 11 pages total.
European Communication (Extended European Search Report) issued by the European Patent Office in European Application No. 18805942.2 dated Apr. 22, 2021, 13 pages total.
European Communication (pursuant to Rule 164(1) EPC) issued by the European Patent Office in European Application No. 18805942.2 dated Jan. 22, 2021, 16 pages total.
Lepage, P. et al., "Dysbiosis in Inflammatory Bowel Disease: A Role for Bacteriophages?" Gut Microbiota (2008) vol. 57, No. 3, pp. 424-425.
Santiago-Rodriguez, T.M. et al., "Transcriptome Analysis of Bacteriophage Communities in Periodontal Health and Disease," BMC Genomics (2015) vol. 16, No. 549, 9 pages total.
Tetz, G. et al., "Bacteriophages as Potential New Mammalian Pathogens," Scientific Reports (2017) vol. 7, No. 7043, 9 pages total.
Tetz, G. et al., "Parkinson's Disease and Bacteriophages as its Overlooked Contributors," Scientific Reports (2018) vol. 8, No. 10812, 11 pages total.
Wagner, J. et al., "Bacteriophages in Gut Samples from Pediatric Crohn's Disease Patients: Metagenomic Analysis Using 454 Pyrosequencing" HHS Public Access Author Manuscript (2013) vol. 19, No. 8, pp. 1598-1608.
Aviv, O. et al., "Poly(hexamethylene guanidine)-poly(ethylene glycol) Solid Blend for Water Microbial Deactivation" Polymer Degradation and Stability (2016) vol. 129, pp. 1-21.
Communication (International Preliminary Report on Patentability) issued by the International Searching Authority in International Application No. PCT/US2018/028640 dated Nov. 26, 2019, 19 pages total.

(56) References Cited

OTHER PUBLICATIONS

Communication (International Preliminary Report on Patentability) mailed in International Application No. PCT/US19/39732 mailed Dec. 29, 2020, 10 pages total.
Communication (International Search Report) issued by the International Searching Authority in International Application No. PCT/US2018/028640 dated Sep. 4, 2018, 8 pages total.
Communication (International Search Report) mailed in International Application No. PCT/US19/39732 mailed Nov. 6, 2019, 5 pages total.
Communication (Written Opinion) issued by the International Searching Authority in International Application No. PCT/US2018/028640 dated Sep. 4, 2018, 18 pages total.
Communication (Written Opinion) mailed in International Application No. PCT/US19/39732 mailed Nov. 6, 2019, 9 pages total.
Costa, L. et al., "Photodynamic Inactivation of Mammalian Viruses and Bacteriophages" Viruses (2012) vol. 4, pp. 1034-1075.
De Haard, H.J.W. et al., "Llama Antibodies Against a Lactococcal Protein Located at the Tip of the Phage Tail Prevent Phage Infection" Journal of Bacteriology (2005) vol. 187, No. 13, pp. 4531-4541.
Findley, K. et al., "The Skin Microbiome: A Focus on Pathogens and Their Association with Skin Disease" PLoS One (2014) vol. 10, No. 10, pp. 1-3.
Gallo, P.M. et al., "Amyloid-DNA Composites of Bacterial Biofilms Stimulate Autoimmunity" Immunity (2015) vol. 42, No. 6, pp. 1171-1184.
Galtier, M. et al., "Bacteriophages to Reduce Gut Carriage of Antibiotic Resistant Uropathogens with Low Impact on Microbiota Composition" Environmental Microbiology (2016) vol. 18, No. 7, pp. 2237-2245.
Garneau, JE et al., "The CRISPR/Cas Bacterial immune System Cleaves Bacteriophage and Plasmid DNA" Nature (2010) vol. 468, No. 7320, pp. 67-71.
Horwich, A et al., "Protein aggregation in disease: a role for folding intermediates forming specific multimeric interactions" Journal of Clinical Investigation, Nov. 2002, vol. 110, No. 9, pp. 1221-1232.
Mirzaei, MK et al., "Isolation of Phages for Phage Therapy: A Comparison of Spot Tests and Efficiency of Plating Analyses for Determination of Host Range and Efficacy" PLoS One (2015) vol. 10, No. 3, pp. 1-13.

Newby, B.N., "Type 1 Inteferons Promote a Diabetogenic Microenvironment in Type 1 Diabetes" (2017) University of Florida, 150 pages total.
Shukla, G.S. et al., "Intravenous Infusion of Phage-Displayed Antibody Library in Human Cancer Patients: Enrichment and Cancer-Specificity of Tumor-Homing Phage-Antibodies" Cancer Immunology, Immunotherapy (2013) vol. 62, No. 8, pp. 1-14.
Tetz, G. et al., "Bacteriophage Infections of Microbiota can Lead to Leaky Gut in an Experimental Rodent Model" Gut Pathogens (2016) vol. 8, No. 33, pp. 1-4.
Tetz, G. et al., "Bacteriophages as New Human Viral Pathogens" Microrganisms (2018) vol. 6, No. 2, 12 pages total.
Tetz, G. et al., "Type 1 Diabetes: an Association Between Autoimmunity, the Dynamics of Gut Amyloid-producing E. coli and Their Phages" bioRxiv (2018) 433110, doi: https://doi.org/10.1101/433110, 31 pages total.
Tetz, G. et al., "Type 1 Diabetes: an Association Between Autoimmunity, the Dynamics of Gut Amyloid-producing E. coli and Their Phages" Scientific Reports (2019) vol. 9, No. 9685, 11 pages total.
Tursi, S.A. et al., "Bacterial Amyloid Curli Acts as a Carrier for DNA to Elicit an Autoimmune Response via TLR2 and TLR9" PLOS Pathogens (2017) vol. 13, No. 4, 25 pages total.
Zaccone, P. et al., "*Salmonella typhirnurium* Infection Halts Developmen of Type 1 Diabetes in NOD Mice, Inflammation and Innate Immunity" Eur. J. Immunol. (2004) vol. 34, No. 11, pp. 3246-3256.
Zaczek, M. et al., "Antibody Production in Response to Staphylococcal MS-1 Phage Cocktail in Patients Undergoing Phage Therapy" Frontiers in Microbiology (2016) vol. 7, No. 1681, pp. 1-14.
Communication (International Preliminary Report on Patentability) mailed in International Application No. PCT/US19/40524 mailed Jan. 14, 2021, 12 pages total.
Office Action issued Dec. 14, 2023 in connection with U.S. Appl. No. 17/051,598.
Matsumoto T, et al. (1998) J. Med. Microbiol. 47:303-308.
Leitner WW, et al. (Dec. 10, 1999) Vaccine. 18(9-10): 765-777.
Meemon K and Sabhon P (2015) Parasitol Res. 114:2807-2813. (DOI 10.1007/s00436-015-4589-6).
Office Action issued Feb. 2, 2024 in connection with U.S. Appl. No. 16/616,231.
Billie et al., PLoS One: 3(12):e3885 (2008).

* cited by examiner

The solution of ordinary differential equations produced a graph where $q(t)=q_1(t)+q_2(t)$ (Fig.1)

METHOD FOR ASSESSING AND INHIBITING AGING AND MEANS OF DETERMINING BIOLOGICAL AGE

CROSS-REFERENCE TO RELATED APPLICATIONS

This application is a U.S. National Phase of International Patent Application No. PCT/US2019/040524, filed on Jul. 3, 2019, which published as WO 2020/010214 A1 on Jan. 9, 2020, and claims priority to U.S. Provisional Application No. 62/693,773, filed Jul. 3, 2018, which application is herein incorporated by reference in its entirety.

SEQUENCE LISTING

The instant application contains a Sequence Listing which has been submitted electronically in ASCII format and is hereby incorporated by reference in its entirety. Said ASCII copy, created on Jul. 1, 2019, is named 244008_000109 sequence list ST25.txt and is 781 bytes in size.

FIELD OF THE INVENTION

Provided herein are methods for assessing ageing process, lifespan, life expectancy, biological age and the rate of aging by determining pangenome gene alterations. Also provided are methods for increasing lifespan and/or inhibiting aging.

BACKGROUND OF THE INVENTION

The quest for increasing human longevity and determination of biological age is the subject of intense study; increase of the human lifespan by postponement of death, preservation of life via the support and maintenance of vital functions, or the achievement of a productive lifespan, for as long as possible, are the most commonly accepted goals of medicine. Consequently, a large number of theories describe lifespan as a result of the interaction of biological, social, economic, genetic, and other factors. An individual's lifespan is largely determined by aging, which is considered a dynamic process leading to the continuous adaptation of the body to lifelong exposure to a variety of stressors. Therefore, aging represents the ways in which the organism adapts to harmful stressors by using genetic, epigenetic, and environmental influences.

The numerous models of the ageing process, which are predominantly based on the forces of natural selection, free radical damage, and telomere-shortening theories represent a highly rich and complex field of research.

One of the first aging models was the concept of the force of natural selection that was widely discussed in order to explain the changes—also referred to as aging—that occur in adult organisms over the course of their lifetimes. The concept of the force of natural selection developed in these works explained the differences in the effects of mutations between organisms of different ages, stating that mutations exert varying effects on organisms according to their ages. According to this theory, the force of selection, which acts on such mutations, decreases upon senescence. It was postulated that aging is a result of processes that may be safe and favourable early in life, but exert cumulative negative impacts later on.

More recently, aging has been defined as the accumulation of diverse cellular, tissue, and organ changes that advance age and are responsible for the increased risk of disease and death, thus representing the main limitation of longevity.

A number of environmental factors affect the ageing and longevity of individuals; these include various chemical agents (e.g., food-derived xenobiotics, polluted air, and carcinogenic microflora-derived metabolites), physical agents (ultraviolet [UV] radiation), and biological agents. The effect of such factors predominantly involves damage to DNA via the generation of reactive oxygen and nitrogen species, alkylating agents, or other compounds, leading to the occurrence of mutations and the accumulation of macromolecular changes. These changes exert major effects on the cells in which they occur, ultimately influencing the longevity of the organism as a whole. In addition, endogenous factors cause changes throughout the lifetime of the organism. For example, recombination or viral transformation leads to the alteration and reconstruction of genetic material, which affects lifespan. In addition, alterations to the genome of the cells of the macroorganism may result from intrinsic mutations acquired during cell division.

The longevity of organisms has been calculated using a wide range of mathematical models. The identification and measurement of markers of aging represent a predominant component of research on aging, and are widely used for the mathematical modelling and prediction of lifespan. Because of the complexity of ageing and the wide range of ways of techniques involved in the modelling and prediction of this process, over 300 theories and models are currently used for the evaluation and analysis of lifespan and longevity.

These models, which are based on statistics of life expectancy and mortality dynamics, or the rate of aging, often require specialized assumptions. For example, Gompertz's law is widely used for the prediction of mean longevity in population studies. This law is based on data showing that the mortality rate of all human populations increases with age after sexual maturity, demonstrating direct geometrical progression. Therefore, according to this law, the mortality rate doubles with every 8-year increase in an adult's age. However, existing models generally focus on the macroorganism and its cells as the main subject of longevity studies. The field of oncogenomics investigates the role of variability in mammalian genes in the development of malignancies as one of the main factors that limit lifespan. The "census" theory was suggested, whereby mutations in more than 1% of human genes contribute to human cancer and reduce life expectancy.

The pangenome concept is a theory that describes the ways in which the collective genetic network of all living organisms interacts with non-living genetic elements (NLGE) involved in the storage and transmission of genetic information. This theory considers life and death from the perspective of the development of new genes and their distribution within the united genetic network. NLGE are represented by non-living objects that contain genetic information such as viruses, plasmids, transposons, and extracellular DNA and RNA. This pool of mobile genetic elements is a complex system known to provide dynamic stability to the components of both the microbiome and macroorganism. In parallel, mammalian organisms (including humans) and microbial symbionts interact in a cooperative way that affects the key vital processes of the host.

The human microbiota includes bacteria, archaea, protozoa, fungi, and viruses (bacteriophages) in dynamic equilibrium with the host. However, viruses are sometimes excluded from the category of microbiota as they are not considered live organisms; the special term "Virobiota" is used to describe this group. Currently, approximately 1,000 bacterial species are known to comprise the microbiota present in the human body, representing an overwhelming minority of the total known bacterial diversity. The collective genes of all microbes comprising the human microbiota, which is termed the "microbiome", are 1,000 times larger in number than the total amount of genes in all human cells; in addition, the human body is estimated to contain 3 to 10 times more bacterial cells than human cells, with about 100 times more genes overall. For example, the human genome encodes less than 30,000 protein-coding genes, whereas the microbiome is represented by 3.3 million unique genes. The microbiome exerts a significant influence on human health and well-being; therefore, some workers have expanded beyond the concept that the human organism is composed of solely eukaryotic cells, and consider the human body as a superorganism comprising of both microbial and human cells.

Gut microbes colonize most mucosal surfaces and contribute to host metabolism. Recent studies have also shown that these microbes are involved in the development and normal function of the immune system, neural systems, and gastrointestinal tract; in addition, these microorganisms have been shown to contribute to mucosal permeability.

Disruption of the microbiome is implicated in numerous human disorders; almost all alterations in the microbiota, leading to the loss of dynamic equilibrium with the host organism, are considered harmful to the host, causing a variety of mammalian pathologies. Quantitative and qualitative alterations to the gastrointestinal microbiota and bacterial overgrowth in the small intestine are associated with the development of numerous diseases such as irritable bowel syndrome, inflammatory bowel disease, rheumatoid arthritis, and intestinal carcinogenesis. Some studies have additionally shown that gut microbiota influence and participate in regulation of the lifespan, with individual longevity attributed to specific microbiota.

SUMMARY OF THE INVENTION

There is a great need in the art to develop methods for increasing longevity and inhibiting aging. The present invention addresses this and other needs by providing methods for assessing ageing process, lifespan, life expectancy, biological age and the rate of aging by determining pangenome gene alterations. Also provided herein are methods for increasing lifespan and/or inhibiting aging. These and other aspects of the invention are specified below.

The model disclosed herein introduces a novel theory of longevity that describes the mechanisms underlying the limitations to lifespan, the aging process, biological age and the causes of mortality; these mechanisms are based on the collective contribution of alterations in the genes of both the macroorganism and its microbiome to determining the individual lifespan.

In one aspect is provided a method for assessing ageing process, lifespan, biological age, biological age the rate of aging and increasing lifespan and/or inhibiting aging in a mammal in need thereof, the method comprising (i) determination of the alteration of the gene composition in mammals and/or NLGE associated with mammals and at least one of the following: microbiota and/or NLGE associated with microbiota (ii) determination of the rate of the alteration of the gene composition in mammals and/or NLGE associated with mammals and at least one of the following: microbiota and/or NLGE associated with microbiota (iii) determination of the remaining lifespan of an individual, defined as the time required for the withdrawal of the difference between the limiting value of alterations of the gene composition in mammals and/or NLGE associated with mammals and at least one of the following: microbiota and/or NLGE associated with microbiota.

In some embodiments, lifespan is increased and/or aging is inhibited by (i) preventing alteration of the gene composition in mammals and/or NLGE associated with mammals and at least one of the following: microbiota and/or NLGE associated with microbiota, and/or (ii) correction of the alterations of the gene composition in mammals and/or NLGE associated with mammals and at least one of the following: microbiota and/or NLGE associated with microbiota.

In some embodiments, the aging is skin aging.

In some embodiments, development and implementation of assessing of the ageing process, lifespan, biological age, biological age and the rate of aging is done with artificial intelligence algorithms. In some embodiments, the method comprises assessing the ageing process, lifespan, biological age, biological age and/or the rate of aging with artificial intelligence algorithms.

In some embodiments, development and implementation of assessing the ageing process, lifespan, biological age, biological age and the rate of aging is done together with epigenome data and/or additional health status data ranging blood analysis, MRI, x-ray, microbiome analysis, transcriptomic and microbiomic data. In some embodiments, the method comprises assessing the ageing process, lifespan, biological age, biological age and/or the rate of aging with epigenome data and/or with additional health status data (e.g., one or more of ranging blood analysis, MRI, x-ray, microbiome analysis, transcriptomic and microbiomic data.)

In some embodiments, the microbiota and NLGE associated with microbiota are selected from the group consisting: Bacilli, Clostridia, Erysipelotrichia, Negativicutes, Sphingobacteria, Flavobacteriia, Proteobacteria, Lentisphaerae, Actinobacteria, Fusobacteria, Cyanobacteria, Bacteroidetes, archea, Ascomycota, Basidiomycota, Zygomycota, Ampullaviridae, Bicaudaviridae, Fuselloviridae, Globuloviridae, Rudiviridae, Lipothrixviridae, Inoviridae, Leviviridae, Corticoviridae, Microviridae, Myoviridae, Podoviridae, Siphoviridae, Tectiviridae, Herpesvirales, Megavirales, Mononegavirales, Nidovirales, Picornavirales, Tymovirales and/or unassigned viruses.

In some embodiments, the microbiota and NLGE associated with microbiota are selected from the spore-forming bacteria.

In some embodiments, the method further comprises analyzing alterations of Individual Pangenome or its components in comparison with data from previous analysis of Individual Pangenome.

In some embodiments, the alterations of Individual Pangenome or its components is done in comparison with data from previous analysis of Individual Pangenome.

In some embodiments, alterations of Individual Pangenome or its components is done in comparison with general "norm" criteria for the genetic composition of mammals and/or NLGE associated with mammals and/or microbiota and/or NLGE associated with microbiota.

In some embodiments, the method is performed to evaluate the certain patient populations. In some embodiments, the method is performed to evaluate a defined patient population.

In some embodiments, the analysis can be performed constantly, every minute, hourly, weekly, monthly, every two months, every three months, every four months, every six months, every nine months, or annually, from example.

The evaluation can be performed on a human subject from day 1 of birth up to 120 years of age.

BRIEF DESCRIPTION OF THE DRAWINGS

In FIG. 1, q crosses the line $q^{sup}$ at a certain $t^{sup}$.

DETAILED DESCRIPTION OF THE INVENTION

Figure 1:
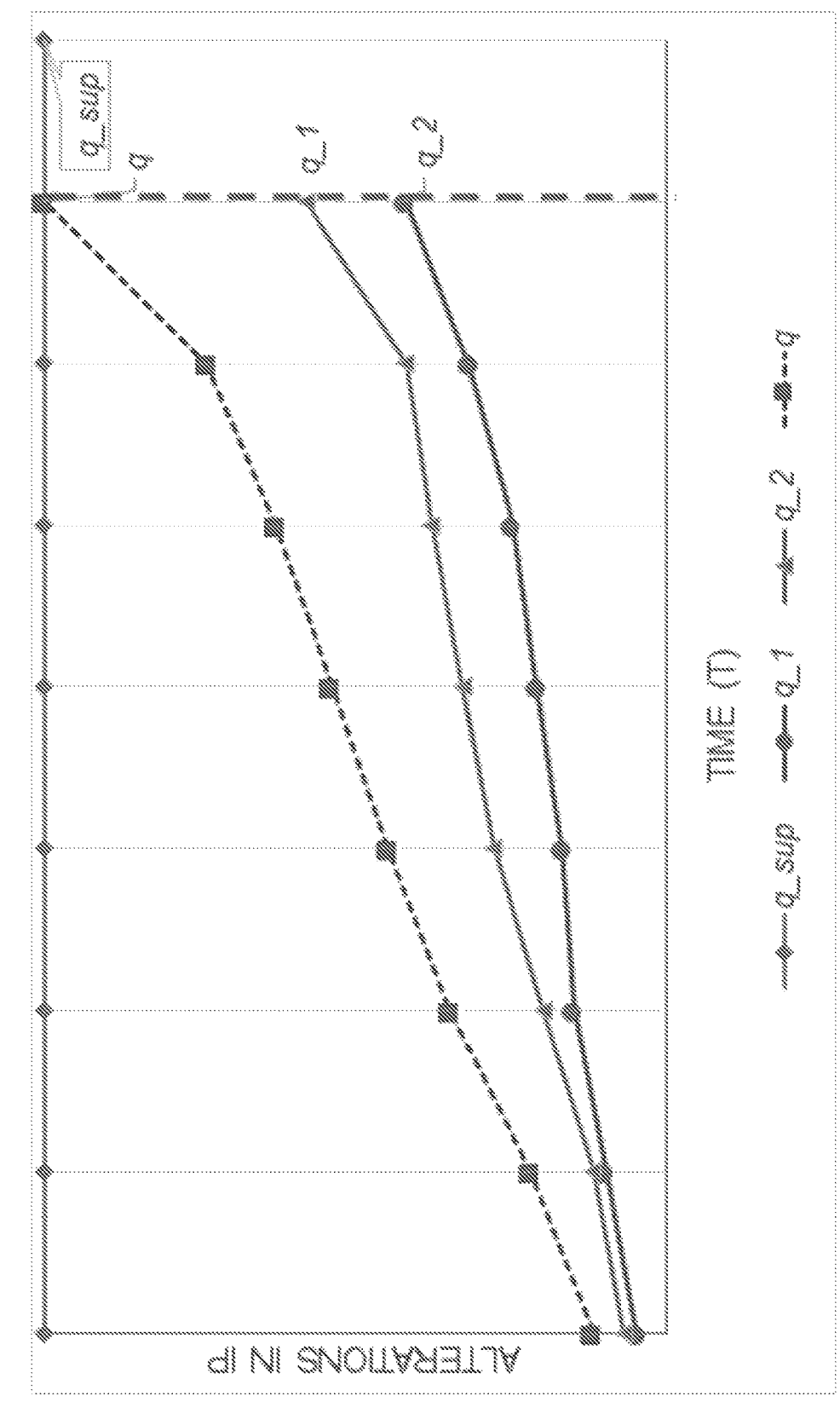
FIG. 1 shows the solution of ordinary differential equations, showing the effect of $q_1$ and $q_2$ as a function of time (t, on the X-axis). The graph was produced using equation (10) that reflects the remaining lifespan. The lines were plotted using unspecified data to reflect the patterns of q, q1, and q2 as functions of time. The values on the Y axis represent the maximum number of alterations comparable with life, where q_sup=100. The values on the X axis represent time of alterations comparable with life in the interval [t0, t_sup]. The green zone and green brackets reflect the number of alterations in the Individual Pangenome that are compatible with life. The red zone and red brackets represent alterations that are not compatible with life, reaching the limiting value $q^{sup}$ at $t^{sup}$.

The present invention is based on the assumption that the lifespan of a macroorganism is influenced by all and every qualitative and quantitative change in the genetic material of the host macroorganism, microbiota, NLGEs associated with the macroorganism, and NLGEs associated with the microbiota (individual longevity could be estimated by considering alterations that occur in the genes of the host organism, including its resident microbiota and associated NLGEs, as an important populations playing an important role in maintaining host health, diseases, lifespan, and ageing).

Definitions

Unless defined otherwise, technical and scientific terms used herein have the same meaning as commonly understood by one of ordinary skill in the art to which this invention belongs.

As used herein, the term "bacteria" encompasses both prokaryotic organisms and archaea present in mammalian microbiota.

The term "microbiota" is used herein to refer to microorganisms (e.g., bacteria, archaea, fungi, protozoa) present in a host animal or human (e.g., in the gastrointestinal tract, skin, oral cavity, vagina, etc.). Microbiota exert a significant influence on health and well-being of the host. The term "microbiome" refers to the collective genes of all organisms comprising the microbiota.

Specific changes in microbiota discussed herein can be detected using various methods, including without limitation quantitative PCR (qPCR) or high-throughput sequencing methods which detect over- and under-represented genes in the total bacterial population (e.g., 454-sequencing for community analysis; screening of microbial 16S ribosomal RNAs (16S rRNA), etc.), or transcriptomic or proteomic studies that identify lost or gained microbial transcripts or proteins within total bacterial populations. See, e.g., U.S. Patent Publication No. 2010/0074872; Eckburg et al., Science, 2005, 308:1635-8; Costello et al., Science, 2009, 326:1694-7; Grice et al., Science, 2009, 324:1190-2; Li et al., Nature, 2010, 464:59-65; Bjursell et al., Journal of Biological Chemistry, 2006, 281:36269-36279; Mahowald et al., PNAS, 2009, 14:5859-5864; Wikoff et al., PNAS, 2009, 10:3698-3703.

As used herein, the term "therapeutically effective amount" refers to the amount of a compound, composition, particle, organism (e.g., a probiotic or a microbiota transplant), etc. that, when administered to a subject for treating (e.g., increasing longevity, inhibiting aging, or preventing or ameliorating a disease, state, disorder or condition) is sufficient to effect such treatment. The "therapeutically effective amount" will vary depending, e.g., on the agent being administered as well as the disease severity, age, weight, and physical conditions and responsiveness of the subject to be treated.

As used herein, the phrase "pharmaceutically acceptable" refers to molecular entities and compositions that are generally regarded as physiologically tolerable.

The terms "patient", "individual", "subject", "mammal", and "animal" are used interchangeably herein and refer to mammals, including, without limitation, human and veterinary animals (e.g., cats, dogs, cows, horses, sheep, pigs, etc.) and experimental animal models. In a preferred embodiment, the subject is a human.

The term "inactivating" or "inactivate" as used herein in connection with bacteriophages refers to a treatment that prevents bacteriophage replication within bacterial cells of mammalian microbiota. Such treatment may or may not prevent an entry of bacteriophages into bacterial cells of mammalian microbiota. Preferably, an inactivated bacteriophage useful in the methods of the present invention does not inhibit growth or activity of mammalian microbiota.

The term "modifying" or "modify" as used herein in connection with bacteriophages refers to a treatment that alters bacteriophage activity within mammalian microbiota in a way that prevents the ability of bacteriophage to cause dysbiosis and/or consequences thereof such as diseases recited therein. Preferably, a modified bacteriophage useful in the methods of the present invention does not inhibit growth or activity of mammalian microbiota.

The terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition but does not yet experience or display clinical or subclinical symptoms of the state, disorder or condition; or (2) inhibiting the state, disorder or condition, i.e., arresting, reducing or delaying the development of the disease or a relapse thereof (in case of maintenance treatment) or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

The terms "about" or "approximately" mean within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

The terms "a," "an," and "the" do not denote a limitation of quantity, but rather denote the presence of "at least one" of the referenced item.

The practice of the present invention employs, unless otherwise indicated, conventional techniques of statistical analysis, molecular biology (including recombinant techniques), microbiology, cell biology, and biochemistry, which are within the skill of the art. Such tools and techniques are described in detail in e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, NJ; Bonifacino et al. eds. (2005) Current Protocols in Cell Biology. John Wiley and Sons, Inc.: Hoboken, NJ; Coligan et al. eds. (2005) Current Protocols in Immunology, John Wiley and Sons, Inc.: Hoboken, NJ; Coico et al. eds. (2005) Current Protocols in Microbiology, John Wiley and Sons, Inc.: Hoboken, NJ; Coligan et al. eds. (2005) Current Protocols in Protein Science, John Wiley and Sons, Inc.: Hoboken, NJ; and Enna et al. eds. (2005) Current Protocols in Pharmacology, John Wiley and Sons, Inc.: Hoboken, NJ. Additional techniques are explained, e.g., in U.S. Pat. No. 7,912,698 and U.S. Patent Appl. Pub. Nos. 2011/0202322 and 2011/0307437.

The term "Individual Pangenome" is used herein to refer to the totality of genes, or a portion thereof, of a host organism, the NLGEs associated with the host organism, and microbiota and NLGEs that are associated with the microbiota.

The terms "non-living genetic elements" and "NLGEs" are used herein to refer to non-living objects that contain genetic information, including, without limitation, viruses, plasmids, transposons, and extracellular DNA and RNA.

MUL-8 is a poli-N1-hydrazine(imino)methyl-1,6-hexane-diamine-poli-N1-amino(imino)methyl-1,6-hexane-diamine.

The present invention provides a mathematical model that is intended to predict, estimate, and improve longevity, by considering the host organism consisting of several genetic subpopulations: host eukaryotic cells, representatives of commensal microbiota, and their respective NLGEs.

Tetz's theory of longevity is a body of ideas and a mathematical model that are intended to predict, estimate, and improve longevity, by considering the host organism consisting of several genetic subpopulations: host eukaryotic cells (including all materials in all 'fluids'), representatives of commensal microbiota, and their NLGEs.

The theory suggests that individual longevity could be estimated by considering alterations that occur in the DNA of the host organism, including its resident microbiota and associated NLGEs, as important populations playing an important role in maintaining host health, diseases, lifespan, and aging. To develop the mathematical model based on Tetz's theory of longevity, the inventors proceeded from some initial points.

The totality (or sum) of DNA that affects the lifespan of an individual is the total DNA in all cells of the macroorganism, microbiome, and NLGEs. NLGEs associated with the microbiota (e.g., bacteriophages, transposons, plasmids, and microbial cell free DNA and RNA) and those associated with the host organism (e.g., viruses, plasmids, and eukaryotic cell free nucleic acids) were identified. The totality of DNA of the macroorganism is represented by the DNA of every cell of the macroorganism and the NLGE associated with the host organism. The microbiome's totality of DNA includes the total DNA from representatives of residential flora, including bacteria, archaea, fungi, protozoa, and NLGEs that are associated with the microbiota. Thus, the novel term "Individual Pangenome" reflects the totality of, or a portion thereof, of all DNA of all cells of the macroorganism, microbiome, and their NLGEs that reflects how each component influences the lifespan of the individual, separately and cumulatively.

Tetz's theory of longevity states that: longevity and aging are determined by the accumulation of alterations in the totality of DNA of the host macroorganism, microbiota, and their NLGEs.

Tetz's theory of longevity assumes that in an ideal theoretical model, a macroorganism could be immortal when cooperation with microbiota is ideal, influence from the outer environment is absent, and intrinsic mutations of the Individual Pangenome are absent. Aging of the host organism is the incidence and accumulation of alterations in the Individual Pangenome. Thus, the lifespan of the individual represents a process of incidence and accumulation of alterations in the Individual Pangenome, while reaching the limit of these alterations is not compatible with life.

Based on this interpretation, Tetz's law of longevity, depicted by Eq. (3), is proposed. The law states that longevity is limited by the accumulation of the limiting value of alterations in the Individual Pangenome. Tetz's law defines the lifespan of a macroorganism as: lifespan is the time required for the accumulation of alterations in the Individual Pangenome to the limiting value that is not compatible with life.

In other words, the lifespan is the withdrawal of the maximum capacity of alterations in the Individual Pangenome that are compatible with life. Under these assumptions, the Individual Pangenome may be modeled as the totality of DNA of the host macroorganism and associated microbiota. Let us use i as the total number of DNA in a macroorganism and NLGEs that are associated with the host organism and j as the total number of DNA in associated microbiota and NLGEs that are associated with microbiota. Then, the Individual Pangenome is represented by vectors $a=(a_1, \ldots, a_i)$ n $b=(b_1, \ldots, b_j)$, where $a_i$ is the DNA of macroorganism and NLGEs associated with the host organism, and $b_j$ is the DNA of the microbiota and NLGEs that are associated with microbiota. The Individual Pangenome is written as follows:

$$IP = a + b \quad (1)$$

Based on this definition of the Individual Pangenome, alterations to the Individual Pangenome are equal to the sum of all of the qualitative and quantitative alterations in the totality of DNA of the macroorganism, microbiota, and associated NLGEs. Therefore, the total number of alterations in the Individual Pangenome is:

$$q = q_1 + q_2 \quad (2)$$

where $q_1$ is the totality of qualitative and quantitative alterations in the DNA of the macroorganism and NGLEs that are associated with the host organism and $q_2$ is the totality of qualitative and quantitative alterations in the DNA of the microbiota and NLGEs that are associated with the microbiota. $q_1$ is defined as a value that reflects the totality of qualitative and quantitative alterations across all DNA of the macroorganism and associated NLGEs compared to an indicator of the "ideal" estimate of the qualitative and quantitative composition of the total DNA in the macroorganism. This provides ideal cooperation with the microbiota and biological immortality in the absence of any external influence or intrinsic mutations. Qualitative alterations reflect nucleotide sequence variations that emerge in totality of all DNA sequences of the macroorganism. It is obvious that various alterations in coding and non-coding DNA components and in different genes impact host longevity differently [Shihab et al., 2015]. For example, the probability that somatic mutations that are acquired during a person's lifetime in TP53 or BRAF genes increase the risk of developing malignancy and reducing lifespan is much higher than a mutation in non-coding element or in low-penetrance (low risk) cancer-susceptibility alleles or nonfunctional junk DNA or redundant genes [Davies et al., 2002; Kellis et al., 2014; Vousden and Lane 2007].

Conversely, quantitative alterations reflect quantitative alterations of DNA, including increase or decrease in the number of genes in the macroorganism because of variation in cell counts or gene amplification and deletion. Different quantitative alterations of body-cell composition that lead to an increase in the number of genes in the macroorganism influence its life expectancy differently. For example, an increase in cell number and, thus, the total number of genes as a result of benign tumor will not affect life expectancy to the same extent as an increase in cell and gene numbers in neoplastic processes, like melanoma [Helfand et al., 2001]. Moreover, an increase of certain types of NLGE (such as cell free DNA) or the over expression of certain plasmids may promote cancer metastasis [Aarthy et al., 2015; Lv et al., 2012].

Thus, $q_1$ reflects both quantitative and qualitative alterations that occur in the total sum of an organism's DNA of all cells in a macroorganism and associated NLGEs, reflecting their significance on macroorganism longevity. As in the case of alterations to DNA in macroorganism, it is assumed that the same consistent patterns would be present in an impact assessment of alterations to the microbiome on host longevity. Thus, it is suggested that all alterations in the composition of microbiota that are expressed by $q_2$ affect the lifespan of the host.

The main limitation when evaluating the influence of alterations to a microbiome on the longevity of the host organism is the lack of studies on its composition and the absence of acceptable determinants for the normal range of the microbiome (i.e., there is no normal range for microbiome composition) [Human Microbiome Project Consortium, 2012]. Tetz's theory of longevity states that the macroorganism can be immortal under certain ideal conditions; thus, normal range is defined as a totality of DNA in all representatives of microbiota and associated NLGEs that provide ideal cooperation with the macroorganism at this time-point and immortality to the host, assuming the absence of any influence from the outer environment and the absence of intrinsic mutations. Thus, q2 indicates both quantitative and qualitative changes that happen in the microbiome and associated NLGEs compared with the state of ideal cooperation with the macroorganism where they provide immortality.

Qualitative alterations to the microbiome reflect nucleotide sequence variations that emerge in DNA of all representative microbiota and NLGEs associated with microbiota. However, as in the case of alterations to host cells, not all alterations in microbiota affect the lifespan of the macroorganism in the same way. For example, reduced endopeptidase activity in *Escherichia coli* as a result of mutation will not affect human lifespan as much as the activation of enzymes leading to the increase of the amount of cancer-promoting metabolites [Schwabe and Jobin, 2013]. So far, it is assumed that the lifespan of the macroorganism is affected by all quantitative changes that lead to alterations in the DNA in the microbiome of bacteria, archaea, fungi, and protozoa. Quantitative alterations in the microbiome reflect an increase or decrease in the total sum of DNA from the microbiome primarily because of variation in microorganism counts. Such variation may arise due to an increase or decrease in any population and the appearance of new species or disappearance of other species. However, different changes lead to different consequences to the host. For example, a moderate shift in the number of *E. coli* will not have major consequences on host longevity. In contrast, an increase in the number of *Bacteroides fragilis* in gut microbiota will negatively affect host longevity because of its association with colon carcinogenesis [Schwabe and Jobin, 2013; Sears et al., 2014; Zhang et al., 2015]. NLGEs associated with microbiota also influence the equilibrium of microflora and, thus, affect how microflora interact with hosts. For example, the acquisition of certain bacteriophages or alterations to cell free DNA lead to significant shifts in microbiota composition [Kahrstrom et al., 2015; Tetz et al., 2009]. Thus, $q_2$ reflects both quantitative and qualitative alterations that emerge in microbiota and associated NLGEs, representing their significance on the longevity of the macroorganism.

The limiting value of alterations in the Individual Pangenome that lead to the death of the host organism may be defined as the sum of all qualitative and quantitative alterations in the totality of DNA of the macroorganism and associated microbiota and their NGLEs that reach the limiting value. Let us denote $q^{sup}$ as the limiting value (or extremum) of alterations in the Individual Pangenome that leads to the death of the host macroorganism. Therefore, conditions for the existence of the Individual Pangenome may be defined as the sum of qualitative and quantitative alterations of DNA in the macroorganism and microbiota that are below then limiting value. Then, Tetz's law of longevity may be expressed as:

$$q_1+q_2=q<q^{sup} \qquad (3)$$

where q equals the totality of qualitative and quantitative alterations in the DNA of the Individual Pangenome; $q_1$ equals the totality of qualitative and quantitative alterations in the DNA of the macroorganism and associated NGLEs; $q_2$ equals the totality of qualitative and quantitative alterations in the DNA of microbiota and associated NGLEs; $\forall q<q^{sup}$ equals the range of permissible alterations in the Individual Pangenome under which the macroorganism remains alive; $\forall q \geq q^{sup}$ is when the macroorganism is dead. Thus, $q_1$ and $q_2$ reflect both quantitative and qualitative alterations that occur in the total sum of all DNA of all cells in the macroorganism, microbiome, and their NLGEs, representing their significance on $q^{sup}$ and macroorganism longevity.

Under the Tetz' law, longevity is defined as the time [0, $t^{sup}$] required for the accumulation of alterations in the Individual Pangenome to the limiting value that is not compatible with life. It is expressed as:

$$t^{sup}:q_1(t^{sup})+q_2(t^{sup})=q^{sup} \qquad (4)$$

where $t^{sup}$ is the time of death of the macroorganism, whereby function q(t) attains a value of $q^{sup}$ for the first time. According to equation, the lifetime of the macroorganism is limited by the accumulation of alterations in the Individual Pangenome or, in other words, by the totality of alterations to DNA in the macroorganism, microbiota, and their NGLEs. Tetz's law states that longevity is limited by the accumulation of alterations in the Individual Pangenome to the limiting value that is not compatible with life.

Tetz's theory of longevity allows the remaining lifespan and rate of aging of individuals to be calculated. The remaining lifespan is expressed in both time and the totality of qualitative and quantitative alterations to DNA in the Individual Pangenome that could occur before reaching the limiting value $q^{sup}$ at $t^{sup}$.

Thus, the excess (i.e., remaining possible) of maximum permissible level of alterations in the Individual Pangenome, expressed as $q^{max}$, is defined as the difference between the number of limiting value of alterations in the Individual Pangenome that is not compatible with life and the value of already altered DNA in the Individual Pangenome up to present time. Mathematically, the excess of maximum permissible level of alterations in the Individual Pangenome is represented as:

$$q^{max} = q^{sup} - q(t) \quad (5)$$

where $q^{max}$ equals the excess of maximum permissible level of alterations in the Individual Pangenome.

Another function reflects alterations in the Individual Pangenome that occur at a certain time period and is expressed as:

$$\Delta q = q(t_2) - q(t_1) \quad (6)$$

Here, $\Delta q$ reflects the decrease of the excess permissible level of alterations in the Individual Pangenome at a certain time period. A negative value may be caused when the value of alterations in the Individual Pangenome at $t_2$ exceed the excess of maximum permissible level of alterations in the Individual Pangenome at previous time-point $t_1$. This situation occurs when there was an alteration in the Individual Pangenome at previous time point $t_1$ that was corrected by the time $t_2$ was reached. This dynamic is compatible with a "hit-and-run" scenario; for instance, if a certain alteration appeared in the Individual Pangenome at $t_1$ but was corrected at $t_2$, other changes in the Individual Pangenome may have been triggered before $t_2$ and not eliminated following To determine the decrease in the remainder of maximum permissible level of alterations in the Individual Pangenome $q^{max}$ (t) for a certain time period, the equation is expressed as:

$$q^{max}(t_2) = q^{max}(t_1) - \Delta q \quad (7)$$

where $\Delta q$ is defined by Eq. (6).

Two other important characteristics are the rate of accumulation of alterations and the rate of reduction in the remainder of the maximum permissible level of alterations at a certain-time point. Both are considered as aging rates, expressed as:

$$\lim_{t \to 0} \frac{\Delta q}{\Delta t} = \frac{dq}{dt} = \frac{d(q^{sup} - q^{max})}{dt} = \frac{dq^{sup}}{dt} - \frac{d(q^{max})}{dt} = -\frac{d(q^{max})}{dt} = V(t) \quad (8)$$

$$\frac{dq^{sup}}{dt} = 0$$

This equation accounts for the accumulation of altered DNA in the Individual Pangenome at a certain time period, and allows the rate of change in the Individual Pangenome to be estimated by comparing this parameter at different time points. The V(t) value may also represent the rate of withdrawal of the maximum capacity of alterations in the Individual Pangenome that are compatible with life at a certain time period. The mean value of V(t) may be defined for different demographic groups allowing the normal range of V(t) to be determined. This Normal criterion could then be applied to determine life expectancy based on the individual V(t) parameter values.

The remaining lifespan of an individual is defined as the time required for the withdrawal of the difference between the limiting value of alterations in the Individual Pangenome that is not compatible with life and the value of already altered genes in the Individual Pangenome at a real-time point.

It is possible to compute the remaining lifespan defined as functions $q_1(t)$ and $q_2(t)$ dependent upon time t. Functions $q_1(t)$ and $q_2(t)$ may be defined by ordinary differential equations:

$$\frac{dq_1}{dt} = \alpha_{11} q_1 + \alpha_{12} q_2 + \sum_{i=1}^{N} \beta_{1,i} + \sum_{f=1}^{X} \omega_{1,f}, \quad (9)$$

$$\frac{dq_2}{dt} = \alpha_{21} q_1 + \alpha_{22} q_2 + \sum_{i=1}^{N} \beta_{2,i} + \sum_{f=1}^{X} \omega_{2,f}.$$

Here, the left-hand-side contains the terms $$\frac{dq_1}{dt} \text{ and } \frac{dq_2}{dt}$$

that each provide the rate of alteration of genes in macroorganism, microbiota, and their NGLEs at a real-time point. The right-hand-side contains terms that describe how different factors influence the rate of accumulation of alterations in the Individual Pangenome and life expectancy reduction:

$$\alpha_{11} = \sum_{k=1}^{I} \alpha_{11,k} -$$

increase in the rate of alterations in DNA of the macroorganism and associated NGLEs, due to the accumulation of alterations in the DNA of the macroorganism and associated NGLEs.

$$\alpha_{12} = \sum_{k=1}^{I} \alpha_{12,k} -$$

increase in the rate of alterations in DNA of the macroorganism and associated NGLEs, due to the accumulation of alterations in microbiota and associated NGLEs.

$$\alpha_{21} = \sum_{k=1}^{I} \alpha_{21,k} -$$

increase in the rate of alterations in DNA of microbiota and associated NGLEs, due to the accumulation of alterations in the DNA of the macroorganism and associated NGLEs.

$$\alpha_{22} = \sum_{k=1}^{I} \alpha_{22,k} -$$

increase in the rate of alterations in DNA of microbiota and associated NGLEs, due to the accumulation of alterations in microbiota and associated NGLEs.

$$\sum_{i=1}^{N} \beta_{1,i} -$$

impact of environmental factors on the incidence of alterations in the DNA of the macroorganism and associated NGLEs $$\sum_{f=1}^{X} \omega_{1,f} -$$

impact of intrinsic factors on the incidence of alterations in the DNA of the macroorganism and associated NGLEs $$\sum_{i=1}^{N} \beta_{2,i} -$$

impact of environmental factors on the incidence of alterations in the microbiome and associated NGLEs $$\sum_{f=1}^{X} \omega_{2,f} -$$

impact of intrinsic factors on the incidence of alterations in the microbiome and associated NGLEs The initial value problems are:

$q_1(t_0) = q_1^{begin}$ $q_2(t_0) = q_2^{begin}$

The solution of ordinary differential equations produced a graph where $q(t) = q_1(t) + q_2(t)$ (FIG. 1)

In FIG. 1, q crosses the line $q^{sup}$ at a certain sup. Then, at every time-point t, the difference between $t^{sup}$ and t reflects the remaining lifespan $t^{life}$, whereby:

$t^{sup} - t = t^{life}$ (10)

Therefore, the model presented herein allows key traits of longevity to be determined based on the simultaneous effects of alterations in the genes of the macroorganism, microbiota, and their NLGEs over a given lifespan.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1. Calculation of Longevity Using Proposed Method

Adult C57BL/6 mice weighing approximately 20 g (Rappolovo, North-West region, Russia) were housed in individual cages in a facility free of known murine pathogens, and were provided feeding ad libitum. To induce immunosuppression, animals administered cyclophosphamide with two intraperitoneal injections at 100 mg/kg at day −4 and −2 prior to the experiment.

Comparative Fecal Microbiome Analysis

Faecal samples were collected at baseline and after each 6 days following tumor transplantation. Bacterial DNA extraction was performed using a QIAamp stool DNA mini kit according to the manufacturer's instructions (Qiagen, Germany). Sequencing libraries of the V3-V4 region were prepared according to the Illumina MiSeq system instructions52. In brief, the V3 and V4 regions of the 16S bacterial rRNA gene were amplified using a two-step polymerase chain reaction (PCR) protocol with V3 and V4 region primers (forward: 5'-TCGTCGGCAGCGTCAGATGTG-TATAAGAGACAGCCTACGGGNGGCWGCAG-3'; reverse: 5'-GTCTCGTGGGCTCGGAGATGTGTATA-AGAGACAGGACTACHVGGGTATCTAAT CC-3') for the first PCR and Nextera XT index primers for the second PCR. Amplicons were cleaned using AMPure XP magnetic beads, and then, Illumina sequencing adapters and dual-index barcodes were added to each amplicon. Libraries were assessed with the Qubit dsDNA HS assay kit (Thermo Fisher Scientific) and TapeStation high sensitivity D1000 ScreenTape (Agilent) and normalized and sequenced on an Illumina MiSeq instrument using a MiSeq reagent kit v2 (500 cycles). Data was analyzed with the MiSeq Reporter software Metagenomics workflow v2.5.1.3 (Illumina). Sequences were grouped into OTUs with a 97% threshold of pairwise identity. The QUIME pipeline was used for quality filtering of DNA sequences, chimera removal (using the USEARCH software), taxonomic assignment.

Figure 2:
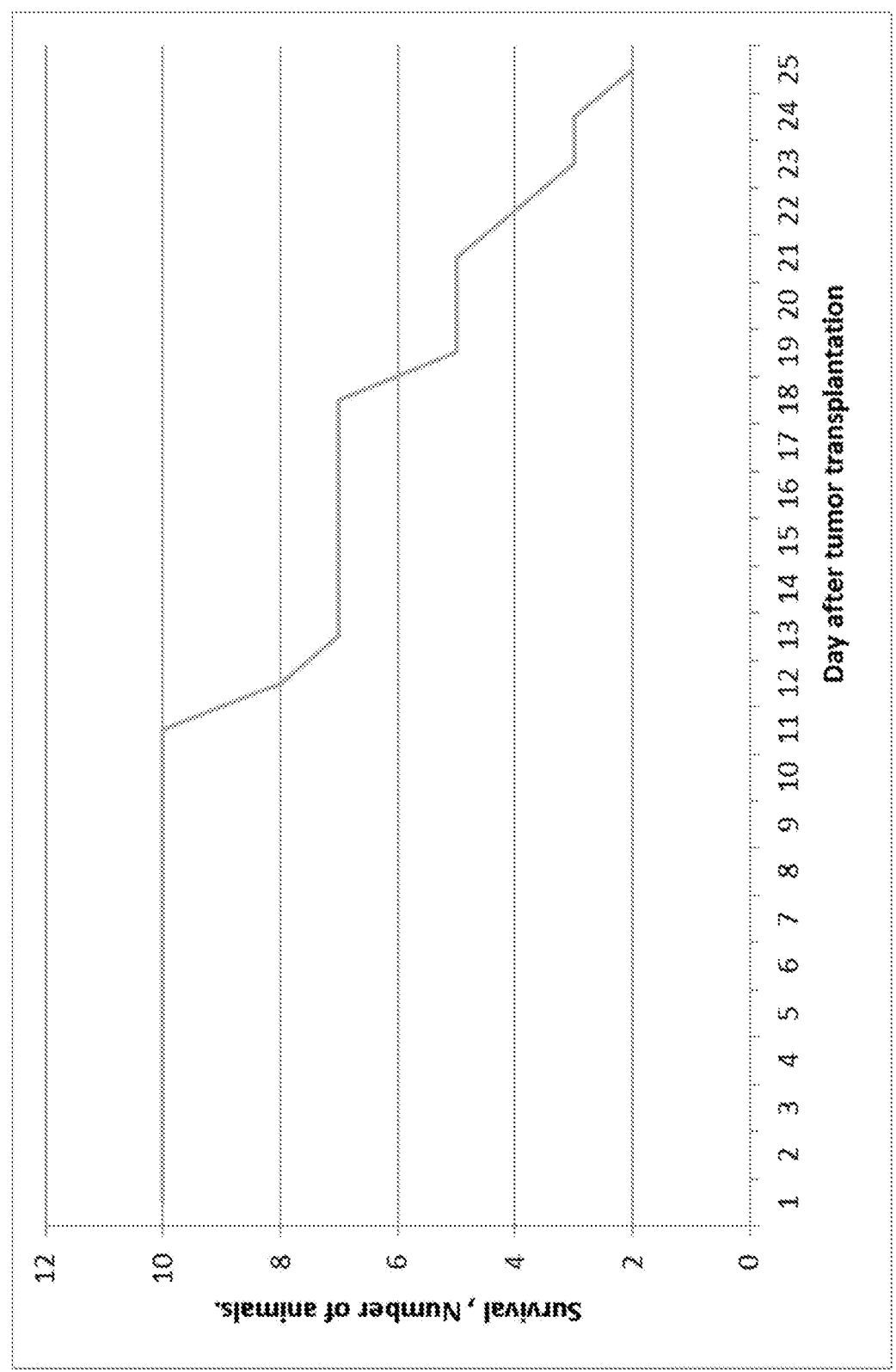
FIG. 2 shows the lifespan of the animals following tumor injections. 50% mortality was assessed by day 18.

Tumors used in this study were derived from neuroblastoma cell lines. Prior to the experiment, tumor cells were maintained in vitro at 37° C. in a humidified 5% CO2 atmosphere in RPMI 1640 supplemented with 10% fetal calf serum. Prior to the injection, cells were separated from the medium, washed and resuspended in Dulbecco's phosphate-buffered saline and $10^8$ cells were injected subcutaneously to animals. First, the inventors evaluated how the tumor size, suggested as an alterations of the part of gene content of the host macroorganism affects accuracy of the calculation of the longevity. See also FIG. 2.

TABLE 1

| Dynamic of the tumor size | | | | | |
|---|---|---|---|---|---|
| Day following tumor transplantation | | | | | |
| 7 | 12 | 14 | 18 | 22 | 25 |
| Tumor size (mm3) 142.1 +/− 12.3 | 309.2 +/− 41.8 | 703.1 +/− 55.0 | 2095.0 +/− 322.6 | 3080.4 +/− 420.4 | 3360.5 +/− 560.9 |

As it is seen, at Day 18, the tumor size was 2095.0 and contributed to the death of 50% of the animal, while at day 12, the tumor size was 309.4 and no animals died. Then the prediction of the mortality was done, taken that the maximum capacity of alterations in the Individual Pangenome for mice is 100 points. Taken that 2095.0 mm$^3$ results in 100 points in 50% animals. However, it was impossible at the 12th day of the experiment to evaluate which animal would survive by the 18$^{th}$ day of the experiment.

Therefore, using the alterations of the part of the macroorganisms genes alterations cannot accurately evaluate which animal would be alive and which would be dead following the triggering of the macroorganism's alterations.

To increase the accuracy of the prediction of the lifespan the evaluation of the alterations of the microbiota were added, along with the evaluation of the macroorganisms. The prediction of the mortality was done, taken that the maximum capacity of alterations in the Individual Pangenome for mice is 100 points. The tumor size of 2095.0 mm$^3$ was artificially taken as 80 points for all the animals. The maximum microbiome alterations were suggested to contribute to the rest 20%. Bacterial component of microbiome alterations were assessed and the results are shown in Table 2.

TABLE 2

| | Day following tumor transplantation | | | |
|---|---|---|---|---|
| Bacteria | 0 | 6 | 12 | 18 |
| Bifidobacteriaceae | 1 | 1 | 0 | 0 |
| Clostridiaceae | 8 | 9 | 7 | 5 |
| Coriobacteriaceae | 19 | 16 | 11 | 9 |
| Erysipelotrichaceeae | 20 | 16 | 13 | 8 |
| Lachnospiraceae | 18 | 17 | 12 | 6 |
| Prevotellaceae | 6 | 6 | 5 | 4 |
| Ruminococcaceae | 17 | 22 | 33 | 43 |
| Veillonelloaceae | 1 | 1 | 3 | 3 |
| Other | 8 | 12 | 16 | 22 |

TABLE 3

| Calculated alpha and beta diversities. | | |
|---|---|---|
| | Day following tumor transplantation | |
| Bacteria | 0 | 18 |
| Simpson Index | 0.1517 | 0.3249 |
| Shannon function | 2.786 | 2.181 |
| Absolute beta Value | 8 | 7 |
| Mountford Index: | −0.2857 | −0.3333 |

Taken the data for the day 0 as norm, the inventors defined that the alteration at day 18 as maximum 20 points of the alterations of the Individual Pangenome. Next, the microbiome of animals following tumor transplantation was analyzed with these inputs to identify animals whose alterations in Individual Pangenome would reach 100 point (in other words, who would die) and who will not achieve.

To that end 1 point was suggested as 26.2 mm$^3$ of tumor size.

Alteration of the Shannon function 1 point was suggested as 0.03 points of the Shannon function.

TABLE 4

| Animal # | # points of the Individual Pangenome due to tumor size at day 12 | # points of the Individual Pangenome due to Shannon function of bacterial component of the microbiome alterations at day 12 | Total # of points at day 12 | Dead/Alive to the 18$^{th}$ day of the experiment |
|---|---|---|---|---|
| 1 | 13.5 | 4 | 17.5 | Alive |
| 2 | 14.4 | 5.2 | 19.6 | Alive |
| 3 | 12.2 | 8.4 | 20.6 | Dead |
| 4 | 13.1 | 7.5 | 20.6 | Dead |
| 5 | 12.9 | 6.3 | 19.2 | Dead |
| 6 | 12.8 | 4.6 | 17.4 | Alive |
| 7 | 13.6 | 7.1 | 20.7 | Dead |
| 8 | 12.8 | 7.4 | 20.2 | Dead |
| 9 | 11.9 | 6.6 | 18.5 | Alive |
| 10 | 12.0 | 4.5 | 16.5 | Alive |

Table 4 shows the results for each individual animal tested. As it is seen, the proposed method allows for identifying and predicting the lifespan for mammals, based on different levels of interaction between the gene composition in mammals and/or NLGE associated with mammals and at least one of the following: microbiota and/or NLGE associated with microbiota.

Example 2. Slowing Down Age-Related Skin Changes by Limiting NLGEs Entering from the Environment In the experiment, both female and male nude mice were used. Starting at 4 weeks of age, the animals were treated with tap water or artesian mineral water applied daily on the right back side. In 38 weeks, skin parameters were measured in the area of application compared to the untreated left back side.

Positive control groups include water not exposed to any environmental factors.

"Filtration" group is water filtered through 0.22 μm pore size Millipore membrane filters.

"Electron" group is water treated with electron flow.

"Prototype" group is water treated with potassium nitrate.

TABLE 5

| Group | Water | Global skin elasticity percentage change (%) |
|---|---|---|
| Positive control | Tap water | −38.2 |
| | Spring water | −32.4 |
| Filtration | Tap water | +8.7 |
| | Spring water | +10.3 |
| Electron | Tap water | +9.1 |
| | Spring water | +11.1 |
| Prototype | Tap water | −42.9 |
| | Spring water | −41.4 |

Thus, it was found that limitation of the environmental NLGEs contacts with skin allows to prevent the development of age-related skin changes.

Non-limiting examples of embodiments of the present invention are presented below:

1. A method and means of determining life expectancy, measuring age and aging, biological aging and increasing longevity, wherein said method and means provide assessing organism aging, which manifests itself as alterations to the composition, activity and amount of the Individual Pangenome genes, and wherein increasing lifespan and slowing down aging process prevents and/or reduces the amount of alterations to composition of genes in the Individual Pangenome, and/or reduces the rate of appearance and/or accumulation of such alterations.

2. A method for assessing ageing process, lifespan, life expectancy, biological age and the rate of aging in a mammal in need thereof, said method comprising (i) determination of the alteration of the gene composition in mammals and/or NLGE associated with mammals and at least one of the following: microbiota and/or NLGE associated with microbiota (ii) determination of the rate of the alteration of the gene composition in mammals and/or NLGE associated with mammals and at least one of the following: microbiota and/or NLGE associated with microbiota (iii) determination of the remaining lifespan of an individual, defined as the time required for the withdrawal of the difference between the limiting value of alterations of the gene composition in mammals and/or NLGE associated with mammals and at least one of the following: microbiota and/or NLGE associated with microbiota.

3. A method of item 1, wherein the life expectancy is determined by periodically assessing alterations to the composition and amount of the Individual Pangenome genes and monitoring the total activity of genes in the cells of a macroorganism.

4. A method of item 1, wherein the life expectancy is determined by periodically assessing alterations to the composition and amount of the Individual Pangenome genes.

5. A method of item 1, wherein the life expectancy is determined by periodically assessing alterations to the composition and amount of the Individual Pangenome genes contained in certain cell types.

6. A method of item 1, wherein the life expectancy is determined by periodically assessing alterations to the composition and amount of genes in the cells of a microorganism.

7. A method of item 1, wherein the life expectancy is determined by periodically assessing alterations to the composition and amount of genes in the cells of a specific type of microorganisms.

8. A method of item 1, wherein the life expectancy is determined by periodically assessing alterations to the composition and amount of genes in microbiota cells.

9. A method of item 1, wherein the life expectancy is determined by periodically assessing alterations to the composition and amount of genes in certain types of the microbiota cells.

10. A method of item 1, wherein the life expectancy is determined by periodically assessing alterations to the composition and amount of genes in the cells of the microbiota core.

11. A method of item 1, wherein the life expectancy is determined by periodically assessing alterations to the composition and amount of NLGE genes in the microorganism.

12. A method of item 1, wherein the life expectancy is determined by periodically assessing alterations to the composition and amount of NLGE genes in the microbiota.

13. A method of item 1, wherein the life expectancy is determined by continuously monitoring alterations to the composition and amount of the Individual Pangenome genes.

14. A method of item 1, wherein the life expectancy is determined by continuously monitoring alterations to the composition and amount of the Individual Pangenome genes contained in certain cell types.

15. A method of item 1, wherein the life expectancy is determined by continuously monitoring alterations to the composition and amount of genes in the cells of the microorganism.

16. A method of item 1, wherein the life expectancy is determined by continuously monitoring alterations to the composition and amount of genes in the cells of a specific type of macroorganism.

17. A method of item 1, wherein the life expectancy is determined by continuously monitoring alterations to the composition and amount of genes in the microbiota cells.

18. A method of item 1, wherein the life expectancy is determined by continuously monitoring alterations to the composition and amount of genes in a certain type of the microbiota cells.

19. A method of item 1, wherein the life expectancy is determined by continuously monitoring alterations to the composition and amount of genes in the cells of the microbiota core.

20. A method of item 1, wherein the life expectancy is determined by continuously monitoring alterations to the composition and amount of NLGE genes in the macroorganism.

21. A method of item 1, wherein the life expectancy is determined by continuously monitoring alterations to the composition and amount of NLGE genes in the microbiota.

22. A method of item 1, wherein the life expectancy is determined while periodically assessing activity of genes in the Individual Pangenome.

23. A method of item 1, wherein the life expectancy is determined while periodically assessing activity of the Individual Pangenome genes in certain cell types.

24. A method of item 1, wherein the life expectancy is determined while periodically assessing total activity of genes in the cells of the macroorganism.

25. A method of item 1, wherein the life expectancy is determined while periodically assessing total activity of genes in the cells of a specific type of macroorganisms.

26. A method of item 1, wherein the life expectancy is determined while periodically assessing total activity of genes in the microbiota cells.

27. A method of item 1, wherein the life expectancy is determined while periodically assessing total activity of genes in the microbiota cells of a certain type.

28. A method of item 1, wherein the life expectancy is determined while periodically assessing changes in total activity of genes in cells of the microbiota core constantly.

29. A method of item 1, wherein the life expectancy is determined while constantly monitoring activity of genes in the Individual Pangenome.

30. A method of item 1, wherein the life expectancy is determined while constantly monitoring activity of genes of certain cell types in the Individual Pangenome.

31. A method of item 1, wherein the life expectancy is determined while constantly monitoring of total activity of genes in cells of a macroorganism.

32. A method of item 1, wherein the life expectancy is determined while constantly monitoring of total activity of genes in cells of a specific type of macroorganisms.

33. A method of item 1, wherein the life expectancy is determined while constantly monitoring of total activity of genes in the microbiota cells.

34. A method of item 1, wherein the life expectancy is determined while constantly monitoring of total activity of genes in the microbiota cells of a certain type.

35. A method of item 1, wherein the life expectancy is determined while constantly monitoring changes in total activity of genes in cells of the microbiota core.

36. A method of item 1, wherein the life expectancy is determined while constantly monitoring rate of alterations to the composition and amount of the Individual Pangenome genes.

37. A method of item 1, wherein the life expectancy is determined while constantly monitoring rate of alterations to the composition and amount of the Individual Pangenome genes contained in certain cell types.

38. A method of item 1, wherein the life expectancy is determined while constantly monitoring rate of alterations to the composition and amount of genes in the cells of the macroorganism.

39. A method of item 1, wherein the life expectancy is determined while constantly monitoring rate of alterations to the composition and amount of genes in the cells of a specific type of macroorganisms.

40. A method of item 1, wherein the life expectancy is determined while constantly monitoring rate of alterations to the composition and amount of genes in the microbiota cells.

41. A method of item 1, wherein the life expectancy is determined while constantly monitoring rate of alterations to the composition and amount of genes in certain types of the microbiota cells.

42. A method of item 1, wherein the life expectancy is determined while constantly monitoring rate of alterations to the composition and amount of genes in the cells of the microbiota core.

43. A method of item 1, wherein the life expectancy is determined while constantly monitoring rate of alterations to the composition and amount of NLGE genes in the microbiota.

44. A method of item 1, wherein the life expectancy is determined while constantly monitoring rate of alterations to the composition and amount of NLGE genes in the macroorganism.

45. A method of item 1, wherein the life expectancy is determined while periodically assessing rate of alterations to the composition and amount of the Individual Pangenome genes.

46. A method of item 1, wherein the life expectancy is determined while periodically assessing rate of alterations to the composition and amount of the Individual Pangenome genes contained in certain cell types.

47. A method of item 1, wherein the life expectancy is determined while periodically assessing rate of alterations to the composition and amount of genes in the cells of the macroorganism. A method of item 1, wherein the biological age is determined by periodically assessing alterations to the composition and amount of the Individual Pangenome genes and monitoring the total activity of genes in the cells of a macroorganism.

48. A method of item 1, wherein the biological age is determined by periodically assessing alterations to the composition and amount of the Individual Pangenome genes.

49. A method of item 1, wherein the biological age is determined by periodically assessing alterations to the composition and amount of the Individual Pangenome genes contained in certain cell types.

50. A method of item 1, wherein the biological age is determined by periodically assessing alterations to the composition and amount of genes in the cells of a microorganism.

51. A method of item 1, wherein the biological age is determined by periodically assessing alterations to the composition and amount of genes in the cells of a specific type of microorganisms.

52. A method of item 1, wherein the biological age is determined by periodically assessing alterations to the composition and amount of genes in microbiota cells.

53. A method of item 1, wherein the biological age is determined by periodically assessing alterations to the composition and amount of genes in certain types of the microbiota cells.

54. A method of item 1, wherein the biological age is determined by periodically assessing alterations to the composition and amount of genes in the cells of the microbiota core.

55. A method of item 1, wherein the biological age is determined by periodically assessing alterations to the composition and amount of NLGE genes in the macroorganism.

56. A method of item 1, wherein the biological age is determined by periodically assessing alterations to the composition and amount of NLGE genes in the microbiota. 57. A method of item 1, wherein the biological age is determined by continuously monitoring alterations to the composition and amount of the Individual Pangenome genes.

58. A method of item 1, wherein the biological age is determined by continuously monitoring alterations to the composition and amount of the Individual Pangenome genes contained in certain cell types.

59. A method of item 1, wherein the biological age is determined by continuously monitoring alterations to the composition and amount of genes in the cells of the macroorganism.

60. A method of item 1, wherein the biological age is determined by continuously monitoring alterations to the composition and amount of genes in the cells of a specific type of macroorganisms.

61. A method of item 1, wherein the biological age is determined by continuously monitoring alterations to the composition and amount of genes in the microbiota cells.

62. A method of item 1, wherein the biological age is determined by continuously monitoring alterations to the composition and amount of genes in a certain type of the microbiota cells.

63. A method of item 1, wherein the biological age is determined by continuously monitoring alterations to the composition and amount of genes in the cells of the microbiota core.

64. A method of item 1, wherein the biological age is determined by continuously monitoring alterations to the composition and amount of NLGE genes in the macroorganism.

65. A method of item 1, wherein the biological age is determined by continuously monitoring alterations to the composition and amount of NLGE genes in the microbiota.

66. A method of item 1, wherein the biological age is determined while periodically assessing activity of genes in the Individual Pangenome.

67. A method of item 1, wherein the biological age is determined while periodically assessing activity of the Individual Pangenome genes in certain cell types.

68. A method of item 1, wherein the biological age is determined while periodically assessing total activity of genes in the cells of the macroorganism.

69. A method of item 1, wherein the biological age is determined while periodically assessing total activity of genes in the cells of a specific type of macroorganisms.

70. A method of item 1, wherein the biological age is determined while periodically assessing total activity of genes in the microbiota cells.

71. A method of item 1, wherein the biological age is determined while periodically assessing total activity of genes in the microbiota cells of a certain type.

72. A method of item 1, wherein the biological age is determined while periodically assessing changes in total activity of genes in cells of the microbiota core constantly.

73. A method of item 1, wherein the biological age is determined while constantly monitoring activity of genes in the Individual Pangenome.

74. A method of item 1, wherein the biological age is determined while constantly monitoring activity of genes of certain cell types in the Individual Pangenome.

75. A method of item 1, wherein the biological age is determined while constantly monitoring of total activity of genes in cells of a macroorganism.

76. A method of item 1, wherein the biological age is determined while constantly monitoring of total activity of genes in cells of a specific type of macroorganisms.

77. A method of item 1, wherein the biological age is determined while constantly monitoring of total activity of genes in the microbiota cells.

78. A method of item 1, wherein the biological age is determined while constantly monitoring of total activity of genes in the microbiota cells of a certain type.

79. A method of item 1, wherein the biological age is determined while constantly monitoring changes in total activity of genes in cells of the microbiota core.

80. A method of item 1, wherein the biological age is determined while constantly monitoring rate of alterations to the composition and amount of the Individual Pangenome genes.

81. A method of item 1, wherein the biological age is determined while constantly monitoring rate of alterations to the composition and amount of the Individual Pangenome genes contained in certain cell types.

82. A method of item 1, wherein the biological age is determined while constantly monitoring rate of alterations to the composition and amount of genes in the cells of the macroorganism.

83. A method of item 1, wherein the biological age is determined while constantly monitoring rate of alterations to the composition and amount of genes in the cells of a specific type of macroorganisms.

84. A method of item 1, wherein the biological age is determined while constantly monitoring rate of alterations to the composition and amount of genes in the microbiota cells.

85. A method of item 1, wherein the biological age is determined while constantly monitoring rate of alterations to the composition and amount of genes in certain types of the microbiota cells.

86. A method of item 1, wherein the biological age is determined while constantly monitoring rate of alterations to the composition and amount of genes in the cells of the microbiota core.

87. A method of item 1, wherein the biological age is determined while constantly monitoring rate of alterations to the composition and amount of NLGE genes in the microbiota.

88. A method of item 1, wherein the biological age is determined while constantly monitoring rate of alterations to the composition and amount of NLGE genes in the macroorganism.

89. A method of item 1, wherein the biological age is determined while periodically assessing rate of alterations to the composition and amount of the Individual Pangenome genes.

90. A method of item 1, wherein the biological age is determined while periodically assessing rate of alterations to the composition and amount of the Individual Pangenome genes contained in certain cell types.

91. A method of item 1, wherein the biological age is determined while periodically assessing rate of alterations to the composition and amount of genes in the cells of the macroorganism.

92. The method of the present invention, wherein the life expectancy and/or biological age is determined while periodically assessing rate of alterations to the composition and amount of genes in the cells of a specific type of macroorganisms.

93. The method of the present invention, wherein the life expectancy and/or biological age is determined while periodically assessing rate of alterations to the composition and amount of genes in the microbiota cells.

94. A method of item 1, wherein the life expectancy and/or biological age is determined while periodically assessing rate of alterations to the composition and amount of genes in certain types of the microbiota cells.

95. A method of item 1, wherein the life expectancy and/or biological age is determined while periodically assessing rate of alterations to the composition and amount of genes in the cells of the microbiota core.

96. A method of item 1, wherein the life expectancy and/or biological age is determined while periodically assessing rate of alterations to the composition and amount of NLGE genes in the macroorganism.

97. A method of item 1, wherein the life expectancy and/or biological age is determined while periodically assessing rate of alterations to the composition and amount of NLGE genes in the microbiota.

98. A method of item 1, wherein the life expectancy and/or biological age determination is used to assess the remaining lifespan.

99. A method of item 1, wherein the life expectancy and/or biological age determination, while periodically and/or constantly assessing alterations to the composition and amount of the Individual Pangenome genes and specific parts and cells thereof, is provided with the use of computational tools.

100. A method of item 1, wherein the life expectancy and/or biological age determination, while periodically and/ or constantly assessing changes in the rate of accumulation of alterations to the genes of the Individual Pangenome and specific parts and cells thereof, is provided with the use of computational tools.

101. A method of item 1, wherein the determination of life expectancy and/or biological age and rate of accumulation of alterations to the composition and amount of the Individual Pangenome genes is used in Wearable Technologies, Mobile/Wireless Health Tools for Measurement.

102. A method of item 1, wherein the determination of life expectancy and/or biological age and rate of accumulation of alterations to the composition and amount of the totality of genes in the Individual Pangenome is used to assess efficiency of the delivered treatment.

103. A method of item 1, wherein the determination of life expectancy and/or biological age and rate of accumulation of alterations to the composition and amount of the totality of genes in the Individual Pangenome is used to assess therapy efficiency in clinical studies. 104. A method of item 1, wherein the amount of alterations to the composition and amount of the Individual Pangenome genes is reduced in order to increase the lifespan.

105. A method of item 1, wherein the amount of alterations to the composition and amount of the Individual Pangenome genes contained in certain cell types is reduced in order to increase the lifespan.

106. A method of item 1, wherein the amount of alterations to the composition and amount of genes in the cells of the macroorganism is reduced in order to increase the lifespan.

107. A method of item 1, wherein the amount of alterations to the composition and amount of genes in the cells of a specific type of macroorganisms is reduced in order to increase the lifespan.

108. A method of item 1, wherein the amount of alterations to the composition and amount of genes in the microbiota cells is reduced in order to increase the lifespan.

109. A method of item 1, wherein amount of alterations to the composition and amount of genes in certain types of the microbiota cells is reduced in order to increase the lifespan.

110. A method of item 1 to the composition and amount of genes of the microbiota core is reduced in order to increase the lifespan.

111. A method of item 1, wherein the amount of alterations to the composition and amount of NLGE genes in the macroorganism is reduced in order to increase the lifespan.

112. A method of item 1, wherein the amount of alterations to the composition and amount of NLGE genes in the microbiota is reduced in order to increase the lifespan.

113. A method of item 1, wherein the increase of the lifespan is provided by reducing the amount of alterations to the composition and amount of the Individual Pangenome genes with the use of gene therapy gene therapy A method of item 1, wherein the increase of the lifespan is provided by reducing the amount of alterations to the composition and amount of the Individual Pangenome genes with the use of genome-editing technologies.

114. A method of item 1, wherein the increase of the lifespan is provided by reducing the amount of alterations to the composition and amount of the Individual Pangenome genes with the use of computational nucleic acids molecules.

115. A method of item 1, wherein the increase of the lifespan is provided by reducing the amount of alterations to the composition and amount of the Individual Pangenome genes via microbiota transplantation or replacing a part microbiota.

116. A method of item 1, wherein the increase of the lifespan is provided by reducing the amount of alterations to the composition and amount of the Individual Pangenome genes via reprogramming of mammalian cells.

117. A method of item 1, wherein the increase of the lifespan is provided by reducing the amount of alterations to the composition and amount of the Individual Pangenome genes via regulation of gene expression.

118. A method of item 1, wherein the rate of emerging alterations to the composition and amount of the Individual Pangenome genes is slowed down in order to increase the lifespan.

119. A method of item 1, wherein the rate of emerging alterations to the composition and amount of the Individual Pangenome genes contained in certain cell types is slowed down in order to increase the lifespan.

120. A method of item 1, wherein the rate of emerging alterations to the composition and amount of genes in the cells of a specific type of macroorganisms is slowed down in order to increase the lifespan.

121. A method of item 1, wherein the rate of emerging alterations to the composition and amount of genes in the macroorganism core is slowed down in order to increase the lifespan.

122. A method of item 1, wherein the rate of emerging alterations to the composition and amount of genes in the microbiota cells is slowed down in order to increase the lifespan.

123. A method of item 1, wherein the rate of emerging alterations to the composition and amount of genes in certain types of the microbiota cells is slowed down in order to increase the lifespan, 124. A method of item 1, wherein the rate of emerging alterations to the composition and amount of genes of the microbiota core is slowed down in order to increase the lifespan.

125. A method of item 1, wherein the rate of emerging alterations to the composition and amount of NLGE genes in the macroorganism is slowed down in order to increase the lifespan.

126. A method of item 1, wherein the rate of emerging alterations to the composition and amount of NLGE genes in the microbiota is slowed down in order to increase the lifespan. 127. A method of item 1, wherein in order to increase the lifespan, the mutagens within the organism are inactivated due to the action of chemical or biological antimutagens.

128. A method of item 1, wherein in order to increase the lifespan, the mutagens within the organism are inactivated due to the action of chemical or biological antimutagens in the gastrointestinal tract.

129. A method of item 1, wherein in order to increase the lifespan, the mutagens within the organism are inactivated due to the action of chemical or biological antimutagens in systemic circulation.

130. A method of item 1, wherein in order to increase the lifespan, the mutagens within the organism are inactivated due to the action of chemical or biological antimutagens produced with the involvement of microbiota.

131. A method of item 1, wherein in order to increase the lifespan, the distribution of the NLGEs associated with the host organism in the Individual Pangenome is limited through their inactivation within the organism under the action of chemical or biological preparations.

132. A method of item 1, wherein in order to increase the lifespan, the distribution of NLGEs (plasmids, transposons)

associated with microbiota is limited through their inactivation within the organism under the action of chemical or biological preparations.

133. A method of item 1, wherein in order to increase the lifespan, the distribution of extracellular DNA within NLGEs (plasmids, transposons) in the microbiota is limited through inactivation by molecules that do not penetrate bacteria comprising the microbiota.

134. A method of item 1, wherein in order to increase the lifespan, the distribution of extracellular RNA within NLGEs in the microbiota is limited through inactivation by molecules that do not penetrate bacteria comprising the microbiota.

135. A method of item 1, wherein in order to increase the lifespan, the distribution of extracellular DNA within NLGEs in systemic circulation and tissue fluid is limited through inactivation by non-cell penetrating molecules.

136. A method of item 1, wherein in order to increase the lifespan, the distribution of extracellular RNA within NLGEs in systemic circulation and tissue fluid is limited through inactivation by non-cell penetrating molecules.

137. A method of item 1, wherein in order to increase the lifespan, the NLGEs distribution in the Individual Pangenome is limited through their inactivation within the organism under the action of MUL-8.

138. A method of item 1, wherein in order to increase the lifespan, the preparations acting on mutagens produced by the microbiota, and preventing alterations to the composition and amount of the Individual Pangenome genes, are introduced to the gut.

139. A method of item 1, wherein in order to increase the lifespan, the preparations acting on mutagens produced by the microbiota, and preventing their action on the microbiome, are introduced to the gut.

140. A method of item 1, wherein in order to increase the lifespan, the preparations acting on mutagens produced by the microbiota, and preventing their action on the cells of the macroorganism, are introduced to the gut.

141. A method of item 1, wherein in order to increase the lifespan, the additional genes coding for DNA repair proteins and restriction-modification proteins which prevent changes in the Individual Pangenome are transferred to the cells.

142. A method of item 1, wherein pascalization is used to prevent RNA and DNA within NLGEs from entering the organism, and to inactivate them within food products 143. A method of item 1, wherein thermal treatment is used to prevent RNA and DNA within NLGEs from entering the organism, and to inactivate them within food products.

144. A method of item 1, wherein gamma-irradiation is used to prevent RNA and DNA within NLGEs from entering the organism, and to inactivate them within food products.

145. A method of item 1, wherein electron flow is used to prevent RNA and DNA within NLGEs from entering the organism, and to inactivate them within food products.

146. A method of item 1, wherein microwave radiation is used to prevent RNA and DNA within NLGEs from entering the organism, and to inactivate them within food products. 147. A method of item 1, wherein ozone is used to prevent RNA and DNA within NLGEs from entering the organism, and to inactivate them within food products.

148. A method of item 1, wherein Capsid-Targeted Viral Inactivation is used to prevent RNA and DNA within NLGEs from entering the organism, and to inactivate them within food products.

149. A method of item 1, wherein Photocatalytic inactivation is used to prevent RNA and DNA within NLGEs from entering the organism, and to inactivate them within food products.

150. A method of item 1, wherein the RNA and DNA within NLGEs are inactivated with MUL-8 to prevent said NLGEs from entering the organism with drinking water.

151. A method of item 1, wherein the RNA and DNA within NLGEs are inactivated by filtration to prevent said NLGEs from entering the organism with drinking water.

152. A method of item 1, wherein the RNA and DNA within NLGEs are inactivated by photocatalysis to prevent said NLGEs from entering the organism with drinking water.

153. A method of item 1, wherein the RNA and DNA within NLGEs are inactivated with ozone to prevent said NLGEs from entering the organism with drinking water.

154. A method of item 1, wherein the RNA and DNA within NLGEs are inactivated with peroxides to prevent said NLGEs from entering the organism with drinking water.

155. A method of item 1, wherein the RNA and DNA within NLGEs are inactivated with metals to prevent said NLGEs from entering the organism with drinking water.

156. A method of item 1, wherein the RNA and DNA within NLGEs are inactivated by pascalization to prevent said NLGEs from entering the organism with drinking water.

157. A method of item 1, wherein the RNA and DNA within NLGEs are inactivated by thermal treatment to prevent said NLGEs from entering the organism with drinking water.

158. A method of item 1, wherein the RNA and DNA within NLGEs are inactivated with gamma-irradiation to prevent said NLGEs from entering the organism with drinking water.

159. A method of item 1, wherein the RNA and DNA within NLGEs are inactivated by electron flow to prevent said NLGEs from entering the organism with drinking water.

160. A method of item 1, wherein the RNA and DNA within NLGEs are inactivated by microwave radiation to prevent said NLGEs from entering the organism with drinking water. 161. A method of item 1, wherein the RNA and DNA within NLGEs are inactivated by Capsid-Targeted Viral Inactivation to prevent said NLGEs from entering the organism with drinking water.

162. A method of item 1, wherein the RNA and DNA within NLGEs are inactivated by Photocatalytic inactivation to prevent said NLGEs from entering the organism with drinking water.

163. A method of item 1, wherein the RNA and DNA within NLGEs antibodies are used to prevent said NLGEs from entering the organism with drinking water.

164. A method of item 1, wherein the RNA and DNA within NLGEs are inactivated with MUL-8 to prevent said NLGEs from entering the organism with lavation water.

165. A method of item 1, wherein the RNA and DNA within NLGEs are inactivated by filtration to prevent said NLGEs from entering the organism with lavation water.

166. A method of item 1, wherein the RNA and DNA within NLGEs are inactivated by photocatalysis to prevent said NLGEs from entering the organism with lavation water.

167. A method of item 1, wherein the RNA and DNA within NLGEs are inactivated with ozone to prevent said NLGEs from entering the organism with lavation water.

168. A method of item 1, wherein the RNA and DNA within NLGEs are inactivated with peroxides to prevent said NLGEs from entering the organism with lavation water.

169. A method of item 1, wherein the RNA and DNA within NLGEs are inactivated with metals to prevent said NLGEs from entering the organism with lavation water.

170. A method of item 1, wherein the RNA and DNA within NLGEs are inactivated by pascalization to prevent said NLGEs from entering the organism with lavation water.

171. A method of item 1, wherein the RNA and DNA within NLGEs are inactivated by thermal treatment to prevent said NLGEs from entering the organism with lavation water 172. A method of item 1, wherein the RNA and DNA within NLGEs are inactivated by gamma-irradiation to prevent said NLGEs from entering the organism with lavation water.

173. A method of item 1, wherein the RNA and DNA within NLGEs are inactivated by electron flow to prevent said NLGEs from entering the organism with lavation water.

174. A method of item 1, wherein the RNA and DNA within NLGEs are inactivated by microwave radiation to prevent said NLGEs from entering the organism with lavation water.

175. A method of item 1, wherein Photocatalytic inactivation is used to prevent RNA and DNA within NLGEs from entering the organism with lavation water.

176. A method of item 1, wherein the RNA and DNA within NLGEs are inactivated in the external environment to prevent said NLGEs from entering the organism.

177. A method of item 1, wherein the RNA and DNA within NLGEs are inactivated in the external environment when treating household items (furniture, indoor spaces, houseware, bathtubs, washbasins, toilet bowls, packaging and storage cans for food products or water) with MUL-8 to prevent said NLGEs from entering the organism.

178. A method of item 1, wherein the RNA and DNA within NLGEs are inactivated in the external environment when treating household items (furniture, indoor spaces, houseware, bathtubs, washbasins, toilet bowls, packaging and storage cans for food products or water) by thermal treatment to prevent said NLGEs from entering the organism.

179. A method of item 1, wherein the RNA and DNA within NLGEs are inactivated in the external environment when treating household items (furniture, indoor spaces, houseware, bathtubs, washbasins, toilet bowls, packaging and storage cans for food products or water) with gamma-irradiation to prevent said NLGEs from entering the organism.

180. A method of item 1, wherein the RNA and DNA within NLGEs are inactivated in the external environment when treating household items (furniture, indoor spaces, houseware, bathtubs, washbasins, toilet bowls, packaging and storage cans for food products or water) by electron flow to prevent said NLGEs from entering the organism.

181. A method of item 1, wherein the RNA and DNA within NLGEs are inactivated in the external environment when treating household items (furniture, indoor spaces, houseware, bathtubs, washbasins, toilet bowls, packaging and storage cans for food products or water) by ultraviolet radiation to prevent said NLGEs from entering the organism.

182. A method of item 1, wherein the RNA and DNA within NLGEs are inactivated in the external environment when treating household items (furniture, indoor spaces, houseware, bathtubs, washbasins, toilet bowls, packaging and storage cans for food products or water) with ozone to prevent said NLGEs from entering the organism.

183. A method of item 1, wherein the RNA and DNA within NLGEs are inactivated in the external environment when treating household items (furniture, indoor spaces, houseware, bathtubs, washbasins, toilet bowls, packaging and storage cans for food products or water) with peroxides to prevent said NLGEs from entering the organism.

184. A method of item 1, wherein the RNA and DNA within NLGEs are inactivated in air conditioning and humidification systems within indoor spaces, motor vehicles, trains and aircrafts, surface and submarine vessels, and spacecrafts in order to prevent said NLGEs distribution and entering the organism.

185. A method of item 1, wherein the RNA and DNA within NLGEs are inactivated within air conditioning and humidification systems by filtering air and liquid used for humidification, in order to prevent said NLGEs distribution and entering the organism.

186. A method of item 1, wherein the RNA and DNA within NLGEs are inactivated within air conditioning and humidification systems by treating air and liquid used for humidification via exposure to ultraviolet radiation, in order to prevent said NLGEs distribution and entering the organism.

187. A method of item 1, wherein the RNA and DNA within NLGEs within air conditioning and humidification systems are inactivated by treating the air and liquid used for humidification via application of Photocatalytic inactivation method, in order to prevent said NLGEs distribution and entering the organism.

188. A method of item 1, wherein the RNA and DNA within NLGEs within air conditioning and humidification systems are inactivated by thermally treating the air and liquid used for humidification, in order to prevent said NLGEs distribution and entering the organism.

189. A method of item 1, wherein the preparations for increasing longevity are used in form of injections, liquids for internal use, enema solutions, douching solutions, in form of eye drops, nasal drops, liquids for treating human and/or domestic animals body surface, and/or surfaces of objects and equipment, in form of tablets and capsules, oral drops, and rinses, pastilles, in form of gel, ointment, or cream, rectal and vaginal suppositories, chewing gums, candies, as well as in form of solutions and powders that are not introduced to the human body.

190. Non-limiting examples of the methods which can be used for the quantitative and/or qualitative analysis of the alteration of the gene composition in mammals and/or NLGE associated with mammals and at least one of the following: microbiota and/or NLGE associated with microbiota thereof in any of the above methods for determining likelihood include, e.g., cultural microbiology methods (including those used for isolation and cultivation phages), Western blotting, ELISA, liquid biopsy methods, liquid chromatography and mass spectrometry (LC/MS) analysis, genetic methods (e.g., DNA or RNA sequencing, including high-throughput methods such as, e.g., Sanger sequencing, single-molecule real-time sequencing, ion semiconductor sequencing, sequencing by synthesis, sequencing by ligation, nanopore sequencing, pyrosequencing, large-scale sequencing, whole genome sequencing, DNA nanoball sequencing, Heliscope single molecule sequencing, single molecule real time (SMRT) sequencing, Tunnelling currents DNA sequencing, sequencing by hybridization, sequencing with mass spectrometry, microfluidic Sanger sequencing, microscopy-based techniques, RNAP sequencing, in vitro virus high-throughput sequencing), proteomic methods (e.g., determining amino acid composition, identification by mass spectrometry, predicting from DNA/RNA sequences, transcriptome analysis), metagenomic methods (e.g., Shotgun metagenomics, high-throughput sequencing, bioinformatics), computational modelling and simulation methods (e.g., metabolic modelling due to the availability of genome-scale metabolic models, software tools for automatically generating models from metagenomic data, flux balance analysis, dynamic modelling of the intestinal microbiota, Lotka-Volterra equations, multi-species modelling approaches, Computational Modelling of Intestinal Host-Microbiota Interactome), data analysis (e.g., principal coordinate analysis, community metabolism, metatranscriptomics, analysis of microbiomes), simple simulation, and any combination thereof as well as mathematical models used to describe biological systems (e.g., Next-generation Sequencing Simulator for Metagenomics (NeSSM), combining complete genomes currently available, a community composition table, and sequencing parameters, [Jia, B., Xuan, L., Cai, K., Hu, Z., Ma, L., & Wei, C. (2013) PLOS One, 8 (10), e75448]; SParse InversE Covariance Estimation for Ecological Association Inference [SPIEC-EASI]; R package dealing with microbiome association [OmiSA]; Parallel-META 3; MethaPlAn. In some embodiments, the computational modelling and simulation methods are those used for determining predisposition of the alterations of microbiota following a specific challenge.

191. The method of any one of items 1 and 2, wherein the method is performed to evaluate in connection with an endpoint in a clinical trial.

192. The method of any one of embodiments 1 and 2, wherein the method is performed to evaluate in connection with a patient population to be enrolled in a clinical trial.

193. The method of any one of items 1 and 2, wherein the method is performed to evaluate in connection with the selection for the therapy for the patient.

194. The method of any one of items 1 and 2, wherein the method is performed to evaluate in speed of disease progression.

195. The method of any one of items 1 and 2, wherein the method is performed to evaluate the survival of patients along with disease progression.

196. The method of any one of items 1 and 2, wherein the method is performed to evaluate the certain patient populations.

197. The method of any one of items 1 and 2, wherein the method is performed in healthy individuals to access the health status.

198. In one embodiment of the above methods for the increase longevity and/or inhibiting aging for the normalization of the NLGE associated with mammals and/or microbiota and/or some component of the microbiota and/or and/or NLGE associated with microbiota, the method comprises replacing the microbiota with fecal microbiota transplantation (FMT) or non-fecal microbiota transplantation (non-FMT) is performed.

199. In some embodiments of the above methods, the Individual Pangenome is comprised of a portion of the genes within the microbiome, the NLGE, and/or the macroorganism.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference in their entirety as if physically present in this specification.

The invention claimed is:
1. A method for improving skin elasticity in a mammalian subject in need thereof, said method consisting of:
   a) administering to the skin of the subject water, wherein such administration does not comprise drinking, and wherein non-living genetic elements (NLGEs) have been inactivated in said water prior to its administration to the subject, and wherein said NLGEs are selected from plasmids, transposons, extracellular DNA, extracellular RNA, and any combinations thereof, and b) assessing skin elasticity in the subject before and after step (a) and then determining the change in the treated skin's elasticity, wherein the treatment method improves the elasticity of the skin relative to treatment with untreated water.

2. The method of claim 1, wherein the method further comprises inactivating the NLGEs in said water prior to its administration to the subject using a method selected from filtration, gamma-irradiation, microwave radiation, pascalization, photocatalysis, electron flow, thermal treatment, treatment with ozone, treatment with peroxide(s), treatment with metals, treatment with MUL-8 (poly-N1-hydrazine(imino)methyl-1,6-hexane-diamine-poly-N1-amino(imino)methyl-1,6-hexane-diamine), capsid-targeted viral inactivation, treatment with antibodies, and any combinations thereof.

\* \* \* \* \*

SEQUENCE LISTING

```
<160> NUMBER OF SEQ ID NOS: 2

<210> SEQ ID NO 1
<211> LENGTH: 50
<212> TYPE: DNA
<213> ORGANISM: Artificial sequence
<220> FEATURE:
<223> OTHER INFORMATION: Synthetic primer
<220> FEATURE:
<221> NAME/KEY: misc_feature
<222> LOCATION: (42)..(42)
<223> OTHER INFORMATION: n is a, c, g, or t

<400> SEQUENCE: 1
tcgtcggcag cgtcagatgt gtataagaga cagcctacgg gnggcwgcag              50

<210> SEQ ID NO 2
<211> LENGTH: 55
<212> TYPE: DNA
<213> ORGANISM: Artificial sequence
<220> FEATURE:
<223> OTHER INFORMATION: Synthetic primer

<400> SEQUENCE: 2
gtctcgtggg ctcggagatg tgtataagag acaggactac hvgggtatct aatcc         55
```